(12) United States Patent
Kim et al.

(10) Patent No.: US 11,675,446 B2
(45) Date of Patent: Jun. 13, 2023

(54) TOUCH DEVICE FOR PASSIVE RESONANT STYLUS, DRIVING METHOD FOR THE SAME AND TOUCH SYSTEM

(71) Applicant: HiDeep Inc., Seongnam-si (KR)

(72) Inventors: Seyeob Kim, Seongnam-si (KR); Bonkee Kim, Seongnam-si (KR); Hyoungwook Woo, Seongnam-si (KR); Hojun Moon, Seongnam-si (KR); Hwanhee Lee, Seongnam-si (KR); Jongsik Kim, Seongnam-si (KR); Youngho Cho, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

(21) Appl. No.: 17/582,135

(22) Filed: Jan. 24, 2022

(65) Prior Publication Data

US 2022/0244806 A1  Aug. 4, 2022

(30) Foreign Application Priority Data

Jan. 29, 2021 (KR) .................. 10-2021-0013508
Nov. 30, 2021 (KR) .................. 10-2021-0169036

(51) Int. Cl.
*G06F 3/0354* (2013.01)
*G06F 3/044* (2006.01)
(Continued)

(52) U.S. Cl.
CPC .......... *G06F 3/03545* (2013.01); *G06F 3/038* (2013.01); *G06F 3/046* (2013.01);
(Continued)

(58) Field of Classification Search
CPC .. G06F 3/0416; G06F 3/03545; G06F 3/0446; G06F 3/0441; G06F 3/0442;
(Continued)

(56) References Cited

U.S. PATENT DOCUMENTS 8,933,897 B2 * 1/2015 Liu .................. G06F 3/0412
345/173
10,921,924 B2 * 2/2021 Lee .................. G06F 3/044
(Continued)

FOREIGN PATENT DOCUMENTS

CN  105446619  3/2016
CN  107179853  9/2017
(Continued)

OTHER PUBLICATIONS

EPO, European Search Report of Application No. 22153496.9 dated Jun. 7, 2022.
(Continued)

*Primary Examiner* — Darlene M Ritchie
(74) *Attorney, Agent, or Firm* — Lex IP Meister, PLLC

(57) ABSTRACT

An embodiment of the present invention provides a touch device for sensing a position of a stylus including a resonance circuit, including: a plurality of electrode; and a touch controller configured to receive a sensing signal from the electrodes to determine a position of the stylus, wherein the electrodes includes electrodes in which directions of currents induced in the electrodes by the resonance circuit are opposite to each other.

17 Claims, 27 Drawing Sheets

(51) Int. Cl.
*G06F 3/041* (2006.01)
*G06F 3/038* (2013.01)
*G06F 3/046* (2006.01)

(52) U.S. Cl.
CPC .......... *G06F 3/0416* (2013.01); *G06F 3/0446* (2019.05); *G06F 3/0441* (2019.05); *G06F 3/0442* (2019.05); *G06F 3/0445* (2019.05); *G06F 3/04164* (2019.05); *G06F 2203/0384* (2013.01); *G06F 2203/04102* (2013.01); *G06F 2203/04106* (2013.01); *G06F 2203/04107* (2013.01); *G06F 2203/04111* (2013.01); *G06F 2203/04112* (2013.01)

(58) Field of Classification Search
CPC .... G06F 3/0445; G06F 3/038; G06F 3/03443; G06F 3/046; G06F 3/04164; G06F 3/0443; G06F 2203/04111; G06F 2203/04112; G06F 2203/04384; G06F 2203/04106; G06F 2203/04102; G06F 2203/04107
See application file for complete search history.

(56) References Cited

U.S. PATENT DOCUMENTS

| | | | |
|---|---|---|---|
| 2014/0022187 | A1 | 1/2014 | Jeong et al. |
| 2016/0084781 | A1* | 3/2016 | Lee .................. G06F 3/0486 324/655 |
| 2017/0205907 | A1* | 7/2017 | Lim .................. G06F 3/03545 |
| 2017/0269731 | A1 | 9/2017 | Wang et al. |
| 2018/0032173 | A1 | 2/2018 | Kim et al. |
| 2018/0103553 | A1 | 4/2018 | Kim et al. |
| 2018/0188889 | A1 | 7/2018 | Hong |
| 2019/0179460 | A1* | 6/2019 | Mizuhashi .......... G02F 1/13338 |
| 2020/0326805 | A1 | 10/2020 | Lee et al. |
| 2022/0043481 | A1* | 2/2022 | Shin .................. G06F 3/0412 |
| 2022/0075413 | A1* | 3/2022 | Park .................. H05K 5/0226 |
| 2022/0113825 | A1* | 4/2022 | Katsurahira .......... G06F 3/0447 |
| 2022/0129094 | A1* | 4/2022 | Tatsuno .............. G06F 1/1677 |
| 2022/0208861 | A1* | 6/2022 | Oh ..................... G06F 3/04164 |
| 2022/0214791 | A1* | 7/2022 | Cho .................. G06F 3/04162 |
| 2022/0253210 | A1* | 8/2022 | Onoda ................ G06F 3/14 |

FOREIGN PATENT DOCUMENTS

| | | |
|---|---|---|
| EP | 3657309 | 5/2020 |
| EP | 3739434 | 11/2020 |
| JP | 2014-021964 | 2/2014 |
| JP | 2014-526085 | 10/2014 |
| JP | 2017-220187 | 12/2017 |
| JP | 2018-509697 | 4/2018 |
| JP | 2018-533085 | 11/2018 |
| KR | 10-2014-0022222 | 2/2014 |
| KR | 10-2014-0035788 | 3/2014 |
| KR | 10-2015-0089710 | 8/2015 |
| KR | 10-2018-0080739 | 7/2018 |
| KR | 10-2019-0105292 | 9/2019 |
| TW | M529885 | 10/2016 |
| TW | 201935204 | 9/2019 |

OTHER PUBLICATIONS

Satoshi Uchino et al., "A full integration of electromagnetic resonance sensor and capacitive touch sensor into LCD", Journal of the Society for Information Display, vol. 27, Issue 6, Apr. 25, 2019.

* cited by examiner

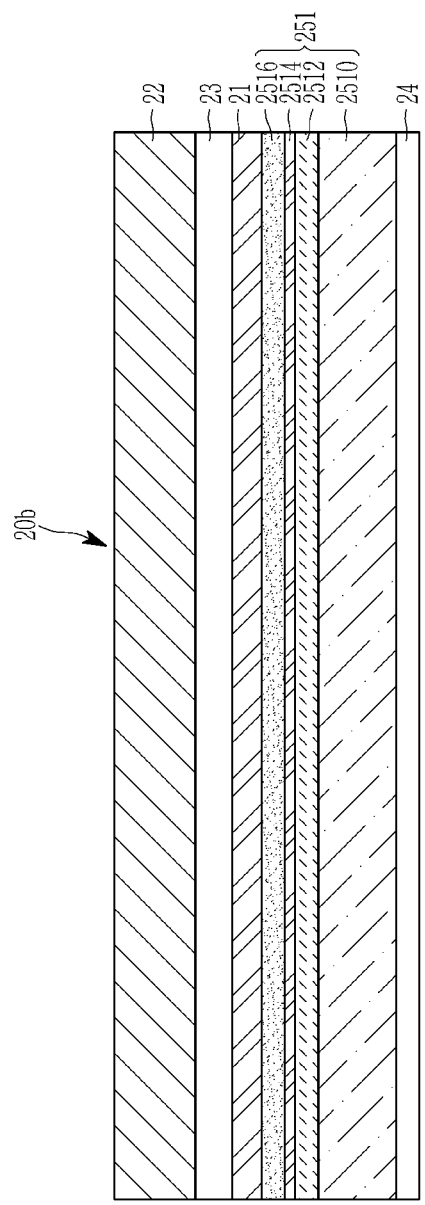

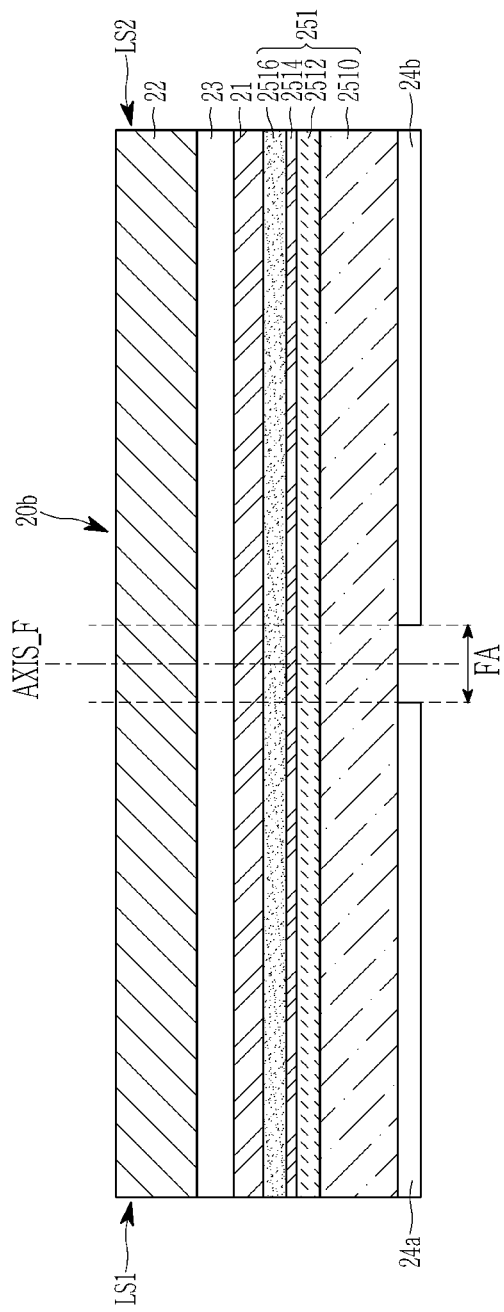

TOUCH DEVICE FOR PASSIVE RESONANT STYLUS, DRIVING METHOD FOR THE SAME AND TOUCH SYSTEM

CROSS-REFERENCE TO RELATED APPLICATION

This application claims priority to and benefits of Korean Patent Application No. 10-2021-0013508, filed in the Korean Intellectual Property Office on Jan. 29, 2021, and Korean Patent Application No. 10-2021-0169036, filed in the Korean Intellectual Property Office on Nov. 30, 2021, the entire contents of which are incorporated herein by reference.

BACKGROUND

(a) Field

The present disclosure relates to a touch device, a driving method thereof, and a touch system.

(b) Description of the Related Art

A touch sensor is provided in various electronic devices such as mobile phones, smart phones, laptop computers, digital broadcasting terminals, personal digital assistants, portable multimedia players, navigations, slate PCs, tablet PCs, ultrabooks, wear devices, head mounted displays, and the like).

In such an electronic device, a touch sensor may be disposed on a display panel displaying an image, or may be disposed in a portion of the electronic device. As a user interacts with the electronic device by touching the touch sensor, the electronic device may provide the user with an intuitive user interface.

The user may use a stylus pen for sophisticated touch input. The stylus pen may be classified into an active stylus pen and a passive stylus pen depending on whether a battery and an electronic component are provided therein.

The active stylus pen has superior basic performance compared to the passive stylus pen and has an advantage of providing additional functions (pen pressure, hovering, and button), but has a disadvantage in that it is difficult to use while charging the battery.

The passive stylus pen is inexpensive and requires no battery compared to the active stylus pen, but has difficult touch recognition as compared to the active stylus pen.

Particularly, in the case of an electro-magnetic resonance (EMR) type of pen among passive stylus pens, a digitizer transfers an electromagnetic signal to the pen, and then the digitizer receives a resonance signal from the pen. In such a digitizer, coils that can be induced by a magnetic signal to receive touch information by a pen are closely arranged. The digitizer may not cope with miniaturization and thinning of electronic devices, and has a problem in that it cannot be designed flexibly.

The above information disclosed in this Background section is only for enhancement of understanding of the background, and therefore, it may contain information that does not form the prior art that is already known in this country to a person of ordinary skill in the art.

SUMMARY

Embodiments have been made in an effort to provide a touch device that can be implemented on one layer, a driving method therefor, and a touch system.

Embodiments have been made in an effort to provide a touch device capable of improving touch sensing performance by a stylus pen, a driving method therefor, and a touch system.

An embodiment of the present invention provides a touch device for sensing a position of a stylus including a resonance circuit, including: a display panel a window positioned on the display panel; a plurality of electrodes positioned between the display panel and the window; and a touch controller configured to receive a sensing signal from the electrodes to determine a position of the stylus close to the window.

Some of electrodes may be positioned in a touch area, the touch device may further include a plurality of traces positioned at an edge of the touch area and connected to correspond to the electrodes, and the traces may include traces in which directions of currents induced in the traces by the resonance circuit are opposite to each other.

A current in a same direction as that of correspondingly connected traces may be induced in electrodes.

A current in a different direction from that of correspondingly connected traces may be induced in electrodes.

The electrodes may include a plurality of first electrodes extending in a first direction, and the traces may include first traces extending in a second direction intersecting the first direction and connected to first ends of a first group of the first electrodes, and second traces connected to second ends of a second group of the first electrodes.

The touch controller may determine a gap between electrodes in which the directions of the induced currents are opposite to each other as a position of the stylus.

The touch controller may determine a gap between electrodes having a largest difference in magnitude of the induced currents as a position of the stylus.

It may further include an antenna configured to include a plurality of dummy electrodes formed on a same layer as that of the electrodes and a plurality of bridges connecting the dummy electrodes to each other, and the touch controller may apply a driving signal to the antenna to output a magnetic signal for sensing the resonance circuit.

Each of electrodes may include two signal input terminals, and the touch controller may output a magnetic signal for sensing the resonance circuit by grounding one of the two signal input terminals and applying a driving signal to the other.

Each of electrodes may include two signal input terminals, and the touch controller may output a magnetic signal for sensing the resonance circuit by applying driving signals of opposite phases to the two signal input terminals.

It may further include a magnetic field shielding layer formed on a different layer from that of the electrodes.

The display panel may have a folding area that is bent about a folding axis and a non-folding area spaced apart by the folding area, and the magnetic field shielding layer may be positioned to correspond to both the folding area and the non-folding area.

The display panel may have a folding area that is bent about a folding axis and a non-folding area spaced apart by the folding area, and the magnetic field shielding layer may be spaced apart to correspond to the non-folding area.

The electrodes may be formed of a metal mesh.

An embodiment of the present invention provides a driving method for a touch device for sensing a position of a stylus including a resonance circuit, including: outputting a driving signal to a plurality of electrodes; receiving a sensing signal from the electrodes, the sensing signal including currents induced in the electrodes in opposite directions by the resonance circuit; and determining the position of the stylus from the sensing signal.

Some of electrodes may be positioned in a touch area, the touch device may further include a plurality of traces positioned at an edge of the touch area and connected to correspond to the electrodes, and the sensing signal may include currents induced in the traces in opposite directions by the resonance circuit.

A current in a same direction as that of correspondingly connected traces may be induced in electrodes.

A current in a different direction from that of correspondingly connected traces may be induced in electrodes.

The determining of the position of the stylus may include determining a gap between electrodes in which the directions of the induced currents are opposite to each other as a position of the stylus.

The determining of the position of the stylus may include determining a gap between electrodes having a largest difference in magnitude of the induced currents as a position of the stylus.

An embodiment of the present invention provides a touch system including: a stylus configured to include a resonance circuit; and a touch sensor configured to receive a sensing signal from the electrodes to determine a position of the stylus, wherein the electrodes includes electrodes in which directions of currents induced in the electrodes by the resonance circuit are opposite to each other.

Some of electrodes may be positioned in a touch area, the touch sensor may further include a plurality of traces positioned at an edge of the touch area and connected to correspond to the electrodes, and the traces may include traces in which directions of currents induced in the traces by the resonance circuit are opposite to each other.

The stylus may further include a power source, and the resonance circuit may be resonated by the power source.

According to the embodiments, there is an advantage in that the manufacturing cost of the touch device can be reduced.

According to the embodiments, there is an advantage of being able to provide a thinner and smaller form factor.

There is an advantage of improving a signal-noise-ratio (SNR) of a signal output from a stylus pen.

According to the embodiments, it is possible to improve reception sensitivity of the touch input.

According to the embodiments, it is possible to accurately calculate touch positions.

According to embodiments, there is an advantage that palm rejection may be performed.

BRIEF DESCRIPTION OF THE DRAWINGS

FIG. 3A schematically illustrates a partially stacked structure of the electronic device of FIG. 1A.

FIG. 3B and FIG. 3C each schematically illustrate a partially stacked structure of the electronic device of FIG. 1B.

DETAILED DESCRIPTION OF THE EMBODIMENTS

Figure 1A:
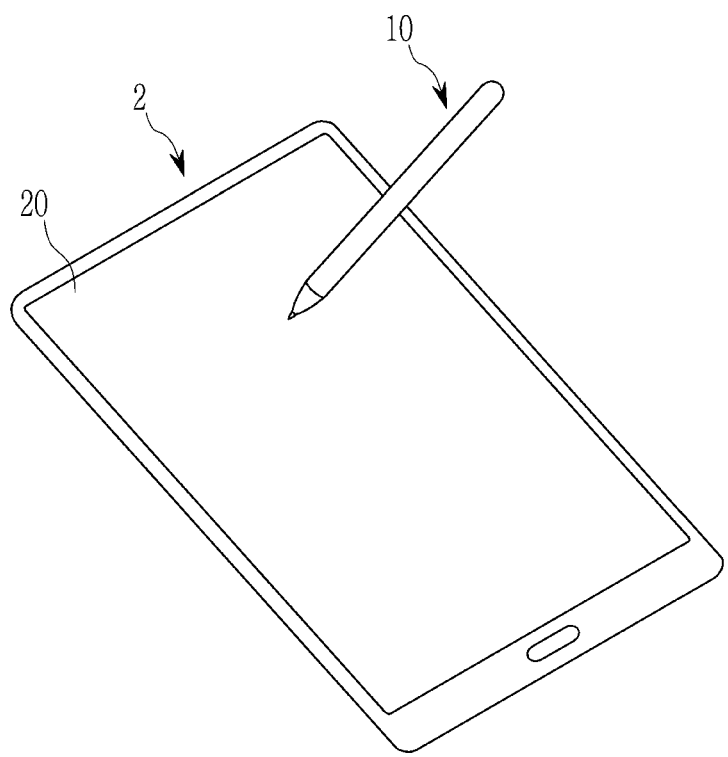
FIG. 1A and FIG. 1B each illustrate a schematic view showing a stylus pen and an electronic device.

Hereinafter, various embodiments of the present document will be described with reference to the accompanying drawings. However, it is not intended to limit the techniques described herein to particular embodiments, and it should be understood as including various modifications, equivalents, and/or alternatives of the embodiments of this document. In connection with the description of the drawings, like reference numerals may be used for like components.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In this document, expressions such as "have", "may have", "includes", or "may include" refer to the presence of a corresponding characteristic (e.g., a numerical value, function, operation, or component such as a part), and does not exclude the presence of additional features.

In this document, expressions such as "A or B", "at least one of A or/and B", or "one or more of A or/and B" may include all possible combinations of the items listed together. For example, "A or B", "at least one of A and B", or "at least one of A or B" indicates (1) including at least A, (2) including at least B; or (3) may refer to all cases including both at least A and at least B.

Expressions such as "first" or "second" used in this document may modify various elements, regardless of order and/or importance, and may modify one element to another, it is used only to distinguish it from the components, and does not limit the components. For example, first user equipment and second user equipment may represent different user equipment regardless of order or importance. For example, without departing from the scope of the rights described in this document, a first component may be referred to as a second component, and similarly, the second component may also be renamed as the first component.

When a component (e.g., a first component) is (operatively or communicatively) "coupled or connected with/to" another component (e.g., a second component), it should be understood that one component may be connected to another component in a direct way or through another component (e.g., a third component). When a component (e.g., a first component) is directly "coupled or connected with/to" another component (e.g., a second component), it may be understood that no other component (e.g., a third component) exists between one component and another component.

As used in this document, the expression "configured to (or configured to)" depends on a situation, e.g., "suitable for", "having the capacity to", "designed to", "adapted to", "made to", or "capable of" may be used interchangeably. The term "configured (or configured to)" may not necessarily indicates only "specifically designed to" in hardware. Instead, in some circumstances, the expression "a device configured to-" may indicate that the device is "capable of-" with other devices or components. For example, the phrase "a processor configured (or configured to perform) A, B, and C" may indicate a generic-purpose processor (e.g., a CPU or an application processor) capable of performing corresponding operations by executing one or more software programs stored in a dedicated processor (e.g., an embedded processor) or memory device for performing the corresponding operation.

Terms used in this document are only used to describe specific embodiments, and may not be intended to limit the scope of other embodiments. Singular forms are to include plural forms unless the context clearly indicates otherwise. Terms used herein, including technical or scientific terms, may have the same meanings as commonly understood by one of ordinary skill in the art described in this document. Among the terms used in this document, terms defined in a general dictionary may be interpreted as having the same or similar meaning as the meaning in the context of the related art, and unless explicitly defined in this document, it should not be construed in an ideal or overly formal sense. In some cases, even terms defined in this document may not be construed to exclude embodiments of this document.

An electronic device according to various embodiments of the present document may include, e.g., at least one of a smart phone, a tablet personal computer, a mobile phone, a video phone, and an e-book reader, a laptop personal computer (PC), a netbook computer, a mobile medical device, a camera, or a wearable device. According to various embodiments, the wearable device may include at least one of an accessory type (e.g. a watch, a ring, a bracelet, an anklet, a necklace, eyeglasses, a contact lens, or a head-mounted-device (HMD)); (e.g. a skin pad or tattoo), or a bioimplantable (e.g. an implantable circuit).

Hereinafter, a touch device and a driving method therefor according to embodiments will be described with reference to necessary drawings.

Figure 1B:
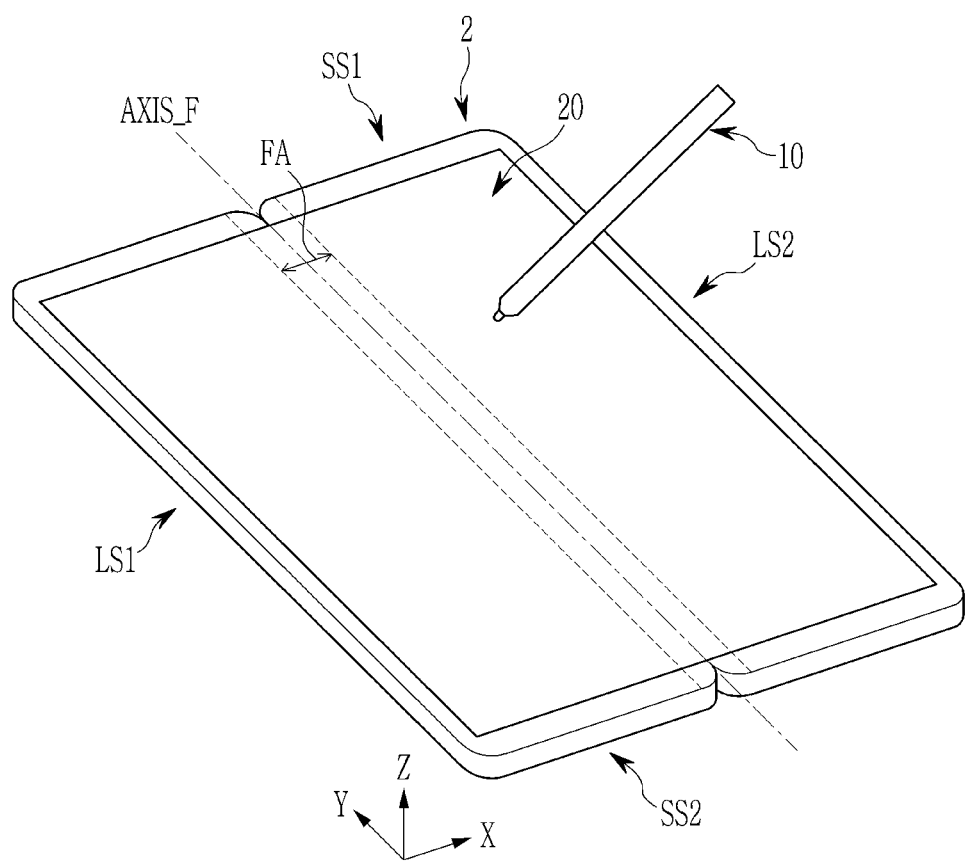

FIG. 1A and FIG. 1B each illustrate a schematic view showing a stylus pen and an electronic device.

Referring to FIG. 1A, a stylus pen 10 may receive a signal outputted from an electronic device 2 near a touch screen 20 of the electronic device 2, or the touch screen 20, and may transmit the signal to the touch screen 20.

Referring to FIG. 1B, the electronic device 2 is foldable. The stylus pen 10 may receive a signal outputted from an electronic device 2 near the touch screen 20 of the foldable electronic device 2, or the touch screen 20, and may transmit the signal to the touch screen 20.

In a member such as a rectangular foldable electronic device 2 or a touch screen 20 included therein, in a plan view, a long side positioned at a left side is referred to as a first long side LS1, a long side positioned at a right side is referred to as a second long side LS2, a short side positioned at an upper side is referred to as a first short side SS1, and a short side positioned at a lower side is referred to as a second short side SS2.

The foldable electronic device 2 may be bent along a predetermined folding direction based on a folding axis AXIS_F crossing the first short side SS1 and the second short side SS2. That is, the foldable electronic device 2 may be able to switch between a folded state and an unfolded state along a folding direction based on the folding axis AXIS_F.

Figure 2A:
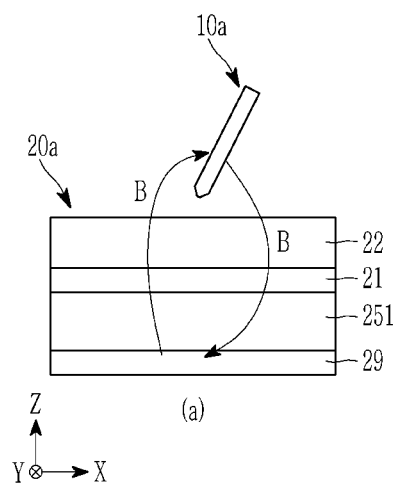
FIG. 2A to FIG. 2D each schematically illustrate a signal transfer operation between a stylus pen and an electronic device.

FIG. 2A to FIG. 2D each schematically illustrate a signal transfer operation between a stylus pen and an electronic device. Referring to FIG. 2A, a touch screen 20a includes a digitizer 29, a display panel 251, a touch electrode layer 21, and a window 22.

In the case of an electro-magnetic resonance (EMR) type of pen among passive stylus pens, when the digitizer 29 transfers a magnetic signal B to an EMR type of stylus pen 10a, a resonance circuit included in the stylus pen 10a resonates with the magnetic signal B. Then, the digitizer 33 receives the resonant magnetic signal B from the stylus pen 10a.

The digitizer 29 may be attached under the display panel 251, and may include a flexible printed circuit board (FPCB) having a plurality of conductive antenna loops formed thereon and a ferrite sheet that blocks a magnetic field generated by the antenna loops, and when the antenna loops generate the magnetic field, blocks eddy currents that may be generated by other electrical devices and components.

In the FPCB, the antenna loops for sensing a position to which a resonance signal is inputted are configured to include a plurality of layers. One antenna loop has a shape overlapping at least another antenna loop in a Z-axis direction. Accordingly, a thickness of the FPCB is thick. Therefore, when the digitizer 29 is used, it is difficult to reduce a thickness and a size of the electronic device 2.

When the digitizer 29 is mounted on the foldable and/or flexible electronic device 2, deformation may occur in the FPCB attached to a folded area when folding occurs. Stress is applied to a wiring member forming the antenna loop by repeated folding, which may result in damage to the wiring member. The ferrite sheet blocks an influence of the magnetic field generated by the antenna loop on inside of the electronic device 2. The ferrite sheet is also thick, is prone to deformation when folding of the electronic device 2 occurs, and may be damaged by repeated folding.

Figure 2B:
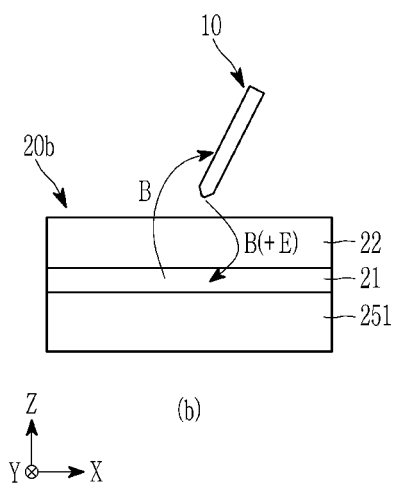

Referring to FIG. 2B, a touch screen 20c includes a display panel 251, a touch electrode layer 21, and a window 22.

In the case of the stylus pen 10 including a resonance circuit, when an electrode of the touch electrode layer 21 transfers the magnetic signal B to the stylus pen 10, the resonance circuit included in the stylus pen 10 resonates with the magnetic signal B. Then, the electrode of the touch electrode layer 21 may receive the resonant electromagnetic signal E and/or B from the stylus pen 10. When the electrode of the touch electrode layer 21 is formed of a metal mesh having low resistance, a magnetic signal from the stylus pen 10 may be sensed.

Similarly, compared with the digitizer 29, the touch screen 20c does not require an additional unit or module for transferring a magnetic signal to the stylus pen 10, so it is possible to reduce the thickness of the touch screen 20b, and there is an advantage in manufacturing cost.

Figure 2C:
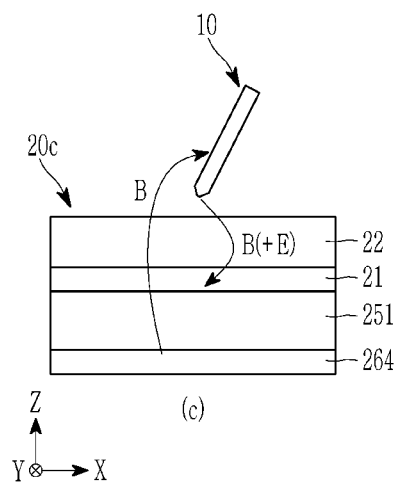

Referring to FIG. 2C, a touch screen 20b includes a loop coil 264 display panel 251, a touch electrode layer 21, and a window 22.

In the case of the stylus pen 10 including a resonance circuit, when the loop coil 264 transfers the magnetic signal B to the stylus pen 10, the resonance circuit included in the stylus pen 10 resonates with the magnetic signal B. Then, the electrode of the touch electrode layer 21 may receive the resonant electromagnetic signal E and/or B from the stylus pen 10.

Compared with the digitizer 29, the loop coil 264 does not receive the magnetic signal B for sensing a touch position, so a wiring structure may be simple, thereby making the touch screen 20b thinner. Accordingly, thickness reduction and miniaturization of the electronic device 2 are possible. In addition, since the loop coil 264 may be formed at various positions to have various sizes, this touch screen 20b may be applied to the foldable and/or flexible electronic device 2.

The loop coil 264 may include a substrate on which an antenna loop is positioned and a ferrite sheet. The antenna loop may be formed of a conductor material such as copper, silver, or the like. The antenna loop may be positioned on a same layer as that of the touch electrode layer 21 in addition to the substrate, and in this case, the antenna loop may be formed of a conductive material exhibiting high transmittance and low impedance, such as metal mesh, ITO, graphene, silver nanowire, and the like. In addition, the antenna loop may be positioned under the window, and in this case, the substrate may not be included in the loop coil 264.

In the above, the touch electrode layer 21 may include a plurality of first touch electrodes for sensing touch coordinates in a first direction and a plurality of second touch electrodes for sensing touch coordinates in a second direction crossing the first direction. Although the touch electrode layer 21 is illustrated as a single layer in FIG. 2, the first touch electrodes and the second touch electrodes may be respectively positioned on different layers, may be positioned to overlap each other, may positioned to not overlap each other, or may be positioned with separate layers therebetween.

Figure 2D:
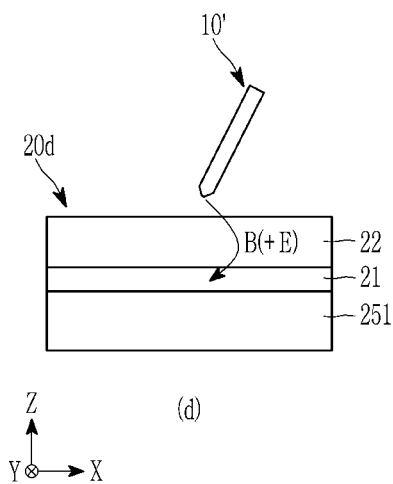

Referring to FIG. 2d, a touch screen 20d includes a display panel 251, a touch electrode layer 21, and a window 22.

In the case of an active stylus pen 10' including a resonance circuit, a resonance circuit included in the active stylus pen 10' resonates using a power source in the active stylus pen 10' (e.g., a battery (including a rechargeable battery) for storing power and a capacitor such as an electric double layered capacitor (EDLC)). Then, the electrode of the touch electrode layer 21 may receive the resonant electromagnetic signal E and/or B from the stylus pen 10'. When the electrode of the touch electrode layer 21 is formed of a metal mesh having low resistance, a magnetic signal from the stylus pen 10' may be sensed. The active stylus pen 10' may include a circuit for outputting an electromagnetic signal E and/or B having a predetermined frequency using a power source as well as a resonance circuit to generate an electromagnetic signal. In addition, the active stylus pen 10' may include both the resonance circuit and the circuit for outputting the electromagnetic signal E and/or B having a predetermined frequency.

The touch screen 20d may receive an electromagnetic signal from the stylus pen 10' without transferring the magnetic signal to the stylus pen 10'. That is, the touch screen 20d does not require an additional unit or module for generating a signal for resonating the resonance circuit included in the stylus pen 10', so it is possible to reduce the thickness and size of the touch screen 20d, and there are advantages in power consumption and manufacturing cost.

Next, a structure of the touch screen 20b of FIG. 2B will be described in detail with reference to FIG. 3A to FIG. 3C.

FIG. 3A schematically illustrates a partially stacked structure of the electronic device of FIG. 1A.

Referring to FIG. 3A, the display panel 251 may include a circuit driving layer 2512 disposed on a substrate 2510. The circuit driving layer 2512 may include a circuit for driving an emission layer 2514 of a pixel displaying an image. For example, the circuit driving layer 2512 may include a plurality of thin film transistors and a capacitor.

An emission layer 2514 may be disposed on the circuit driving layer 2512. The emission layer 2514 may include an organic emission layer. The emission layer 2514 may emit light with various luminance depending on a driving signal transferred from the circuit driving layer 2512.

A common electrode layer 2516 may be disposed on the emission layer 2514. The common electrode layer 2516 may have at least one opening in the form of a slit.

An encapsulation layer 2516 may be disposed on the common electrode layer 2516. The encapsulation layer 2516 may include an inorganic layer or a stacked layer of an inorganic layer and an organic layer. As another example, glass or an encapsulation film may be applied as the encapsulation layer 2516.

A touch electrode layer 21 or a touch electrode may be positioned on the encapsulation layer 2516. The touch electrode layer 21 is a layer that recognizes a touch input, and may perform a function of a touch member. The touch electrode layer 21 may include a plurality of touch regions and touch electrodes.

A polarization layer 23 may be disposed on the touch electrode layer 21. The polarization layer 23 may serve to reduce external light reflection. The polarization layer 23 may be attached on the touch electrode layer 21 through an adhesive layer. The polarization layer 23 may be omitted.

A protective layer 22 may be disposed on the polarization layer 23

The protective layer 22 may include, e.g., a window member. The protective layer 22 may be attached on the polarization layer 23 by an optically transparent adhesive or the like.

A magnetic field shielding layer 24 may be disposed under the display panel 251. The magnetic field shielding layer 24 may include a ferrite sheet that blocks a magnetic field. In addition, the magnetic field shielding layer 24 may include ferrite powder adhered under the substrate 2510. The magnetic field shielding layer 24 may block eddy currents that may be generated by other electrical elements, constituent elements, when the touch electrode layer 21 and/or the stylus pen 10 generates a magnetic field.

Figure 3B:
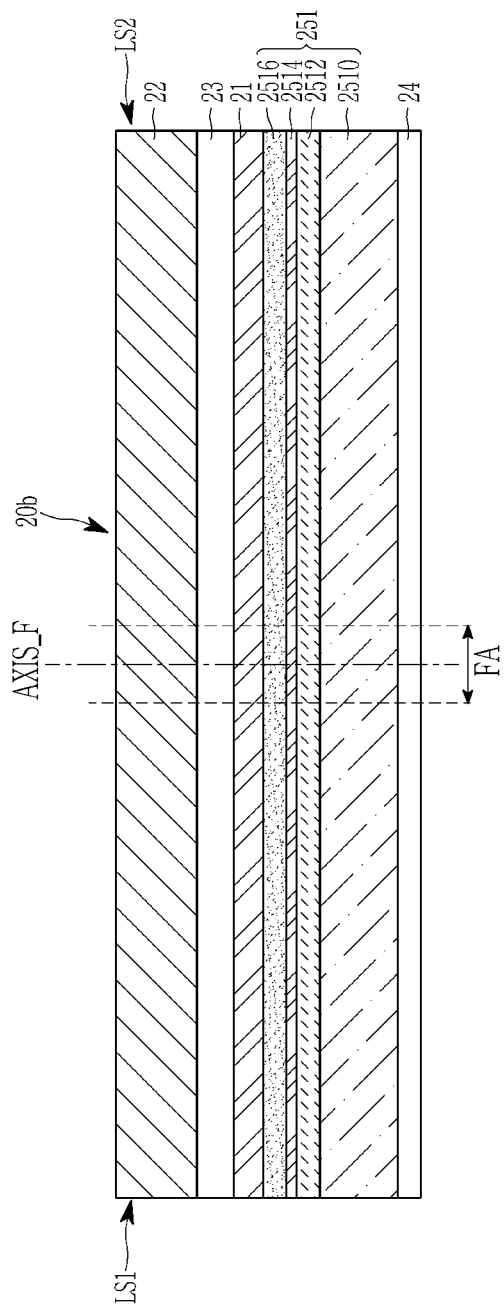

FIG. 3B and FIG. 3C each schematically illustrate a partially stacked structure of the electronic device of FIG. 1B.

A stacked structure of FIG. 3B is the same as that of FIG. 3A, but the magnetic field shielding layer 24 may be positioned in a folded area (hereinafter, referred to as a folding area) FA when the foldable electronic device 2 is folded based on the folding axis AXIS_F.

Compared to the stacked structure of FIG. 3B, the magnetic field shielding layer 24 may be positioned in a stacked structure of FIG. 3C except for the folding area FA or one area included in the folding area FA. For example, the magnetic field shielding layer 24 may include a first sheet 24a positioned between the folding area FA and the long side LS1 and a second sheet 24b positioned between the folding area FA and the long side LS2. The magnetic field shielding layer 24 may include a plurality of sheets in addition to the two sheets, and even in this case, the magnetic field shielding layer 24 may be disposed on a portion of a rear surface of the display panel 251 except for the folding area FA or in an area except for a portion of the folding area FA.

Next, the display device 2 according to embodiments will be described with reference to FIG. 4.

Figure 4:
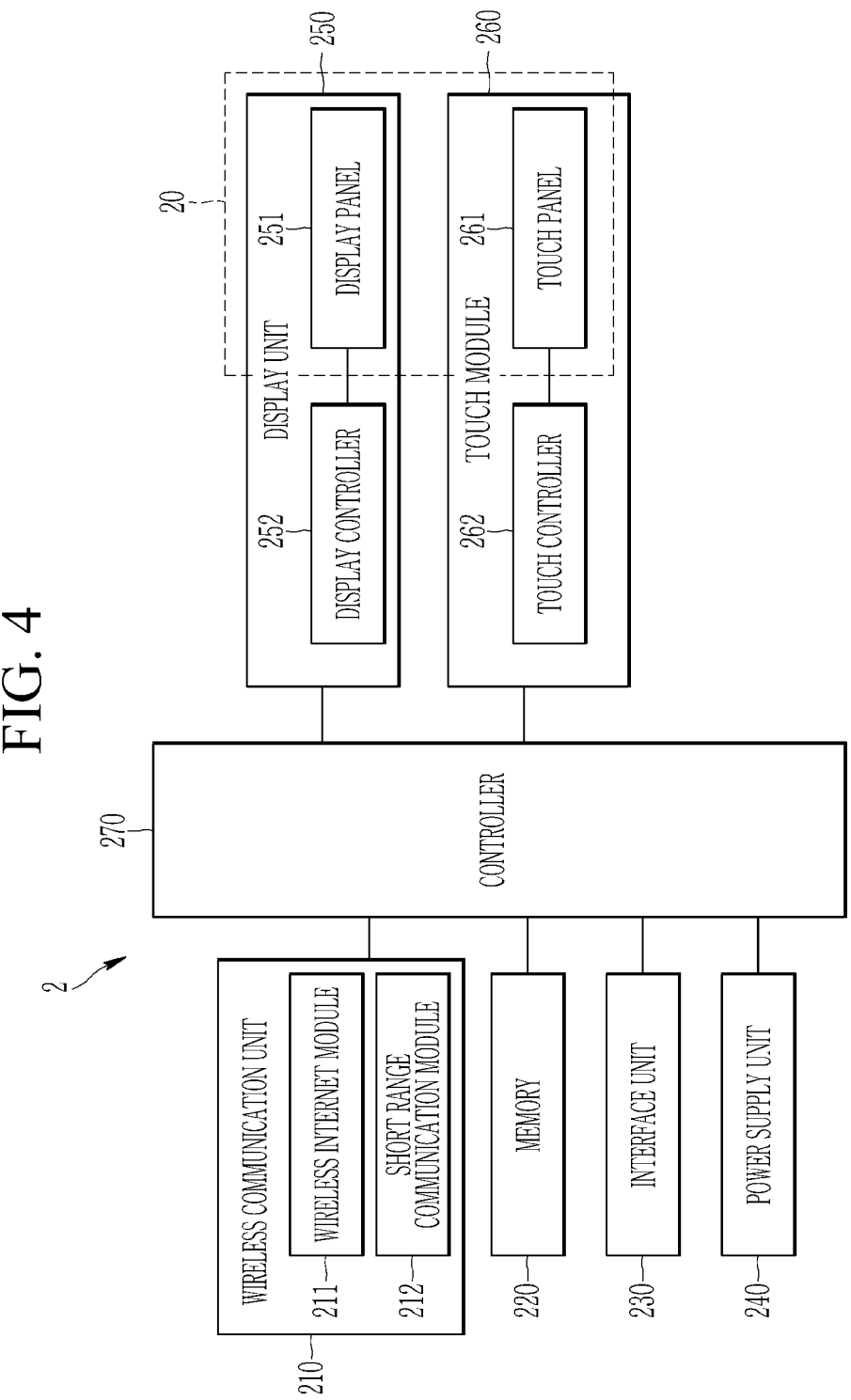
FIG. 4 illustrates a block diagram schematically showing an electronic device.

FIG. 4 illustrates a block diagram schematically showing an electronic device.

As illustrated therein, the electronic device 2 may include a wireless communication unit 210, a memory 220, an interface unit 230, a power supply unit 240, a display unit 250, a touch module 260, a controller 270, and the like. The constituent elements illustrated in FIG. 4 are not essential for implementing an electronic device, so the electronic device described in the present disclosure may include more or less constituent elements than the foregoing listed constituent elements.

Specifically, among the constituent elements, the wireless communication unit 210 may include at least one module that enables wireless communication between the electronic device 2 and a wireless communication system, between the terminal 2 and another electronic device 2, or between the electronic device 2 and an external server. In addition, the wireless communication unit 210 may include at least one module for connecting the electronic device 2 to at least one network.

The wireless communication unit 210 may include a wireless Internet module 211 and a short range communication module 212.

The wireless Internet module 211 refers to a module for wireless Internet connection, and may be embedded in the electronic device 2. The wireless Internet module 211 is configured to transmit and receive wireless signals in a communication network according to wireless Internet technologies. The wireless Internet module 211 transceives a wireless signal in a communication network according to the wireless Internet technologies. Examples of the wireless Internet technology include a Wireless Local Area Network (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), New Radio (NR), Long Term Evolution (LTE), and Long Term Evolution-Advanced (LTE-A), and the wireless Internet module 171 transceives data according to at least one wireless Internet technology in a range including Internet technology which is not listed above.

The short range communication module 212 is for short range communication, and may support short range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi direct, and Wireless Universal Serial Bus (USB) technologies. The short range communication module 212 may support wireless communication between the electronic device 2 and the wireless communication system, the electronic device 2 and a device capable of wireless communication, or the electronic device 2 and a network, in which an external server is located, through a wireless area network. The wireless area network may be a wireless personal area network.

Herein, the device capable of wireless communication may be a mobile terminal capable of exchanging (or interworking) data with the electronic device 2 according to the present invention, e.g., a smart phone, a tablet PC, a notebook computer, etc. The short range communication module 212 may sense (or recognize) a device capable of wireless communication which is capable of communicating with the electronic device 2, around the electronic device 2. Further, when the sensed device capable of wireless communication is a device authenticated to communicate with the electronic device 2 according to the embodiment, the controller 270 may transmit at least some of data processed by the electronic device 2 to the device capable of wireless communication through the short-range communication module 212. Accordingly, a user of the device capable of wireless communication may use data processed in the electronic device 2 through the device capable of wireless communication.

In addition, the memory 220 stores data supporting various functions of the electronic device 2. The memory 220 may store a plurality of application programs (or applications), data for operating the electronic device 2, and commands which are driven in the electronic device 2.

The interface unit 230 serves as a passage of various kinds of external devices connected to the electronic device 2. The interface unit 230 may include at least one of a wired/wireless headset port, an external charger port, a wired/wireless data port, a memory card port, a port for connection with a device equipped with an identification module, an audio input/output (I/O) port, a video I/O port, and an earphone port.

The power supply unit 240 receives power from an external power source and an internal power source, and supplies the power from the power source to each constituent element included in the electronic device 2 under the control of the control unit 270. The power supply unit 240 includes a battery, and the battery may be an embedded battery or a replaceable battery.

The display unit 250 displays (outputs) information processed by the electronic device 2. For example, the display unit 250 may display execution image information of an application program driven in the electronic device 2, or user interface (UI) and graphical user interface (GUI) information according to the execution image information.

The display unit 250 may include a liquid crystal display (LCD), an organic light-emitting diode (OLED) display, an e-ink display, a quantum-dot light emitting display, a micro light emitting diode (LED) display, etc.

The display unit 250 includes a display panel 251 for displaying an image, and a display controller 252 connected to the display panel 251 to supply signals for displaying an image to the display panel 251. For example, the display panel 251 may include a plurality of pixels connected to signal lines such as a plurality of scan lines and a plurality of data lines, and a scan driver/receiver for supplying a scan signal to the scan lines, and the display controller 252 may include a data driver IC for generating a data signal applied to a data line, a timing controller for controlling an overall operation of the display unit 250 by processing an image signal, and a power management IC.

The touch module 260 senses a touch (or touch input) applied to a touch area by using a capacitive method. As an example, the touch module 260 may be configured to convert a change in capacitance, voltage, current, or the like, which are generated in a specific portion, into an electrical input signal. The touch module 260 may be configured to sense a position, an area, a capacitance at the touch, and the like, when a touch object that applies a touch onto a touch area is touched on the touch module 260. Herein, the touch object indicates an object applying a touch to the touch sensor, and may be, e.g., a body part of a user (finger, palm, etc.), a passive or active stylus pen 10, or the like.

The touch module 260 includes a touch sensor 261 in which a touch electrode is positioned, and a touch controller 262 configured to transfer touch data to the controller 270 and/or the display controller 252 by applying a driving signal to the touch sensor 261 and receiving a sensing signal from the touch sensor 261.

The touch controller 262 may be connected to at least one of a plurality of first touch electrodes to apply a driving signal, and may include a first driver/receiver configured to receive a sensing signal, a second driver/receiver connected to at least one of a plurality of second touch electrodes to apply a driving signal and receive a sensing signal, and a micro control unit (MCU) configured to control operations of the first driver/receiver and the second driver/receiver and to acquire a touch position by using a sensing signal outputted from the first and second driver/receiver.

The display panel 251 and the touch sensor 261 may be referred to as a touch screen 20 by forming a mutual layer structure or being integrally formed.

The controller 270 may control driving of the electronic device 2, and may output touch coordinate information in response to a touch sensing result of the electronic device 2. In addition, the controller 270 may change a frequency of the driving signal in response to a touch sensing result thereof.

The controller 270 typically controls a general operation of the electronic device 2 in addition to the operation related to the application program. The controller 270 processes the input or output signal, data, information, and the like, or drives the application program stored in the memory 220 through the foregoing constituent elements, thereby providing the user with or processing the appropriate information or function.

In addition, the controller 270 may control at least a part of the constituent elements described with reference to FIG. 4 in order to drive the application program stored in the memory 220. Further, the controller 270 may combine two or more of the constituent elements included in the distance measuring apparatus 2 and operate the combined constituent elements for driving the application program.

Although it has been described above that the touch module 260 is included in the electronic device 2 together with the display unit 250, the electronic device 2 may include only the touch module 260.

Figure 5A:
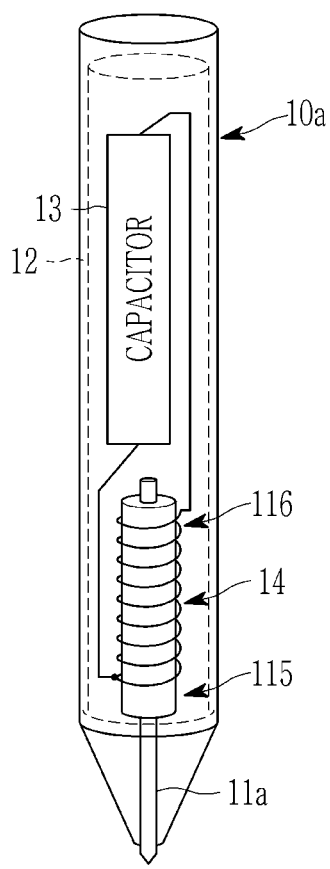
FIGS. 5A and 5B each illustrate a stylus pen according to an embodiment.
Figure 5B:
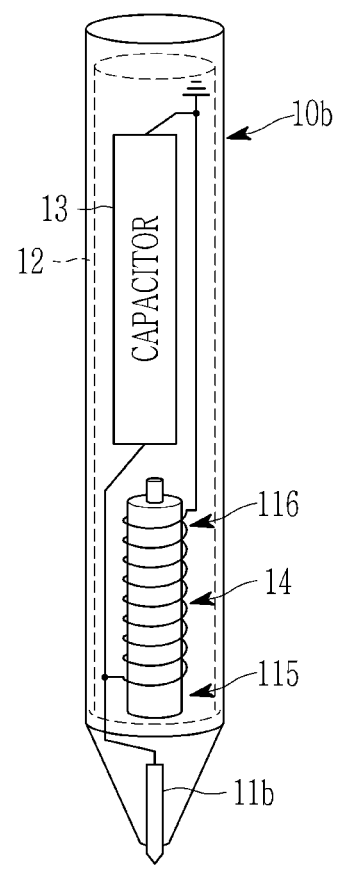

FIGS. 5A and 5B each illustrate a stylus pen according to an embodiment.

The stylus pens of FIG. 5A and FIG. 5B commonly include resonance circuit 12 within a housing.

The resonance circuit portion 12, which is an LC resonance circuit, may resonate with a driving signal outputted from the touch screen 20. The driving signal may include a signal (e.g., a sine wave, a square wave, etc.) having a frequency corresponding to a resonance frequency of the resonance circuit 12. For resonance, a resonance frequency of the resonance circuit portion 12 and a frequency of the driving signal must be the same or very similar. Resonance frequencies of the stylus pens 10a and 10b depend on design values of the resonance circuit 12 of the stylus pens 10a and 10b. When an electrode 21 of FIG. 2B or the loop coil 264 of FIG. 2C generates an electromagnetic field by a driving signal, the resonance circuit 12 of the stylus pen 10a or 10b resonates using a signal received through a change in a magnetic field.

Elements of each of the stylus pens 10a and 10b may be accommodated in a housing. The housing may have a cylindrical shape, a polygonal shape, a column shape having at least part of a shape of a curved surface, an entasis shape, a frustum of a pyramid shape, a circular truncated cone shape, or the like, but it is not limited thereto. Since the housing has an empty interior, it is possible to accommodate elements of the stylus pen 10a or 10b such as the resonance circuit 12 therein. The housing may be made of a non-conductive material.

As illustrated in FIG. 5A, an EMR type of stylus pen 10a includes a core 11a and a resonance circuit 12. The resonance circuit 12 includes an inductor 14 and a capacitor 13. The inductor 14 includes a ferrite core 115 through which the core 11a passes, and a coil 116 wound on an outer surface of the ferrite core 115.

A first end of the core 11a protrudes from the ferrite core 115 as a pen tip. The core 11a may be formed to include an electrode core made of a conductor, e.g., a hard resin mixed with a conductive metal or conductive powder.

In the ferrite core 115, for example, a through hole in an axial direction of a predetermined diameter (e.g., 1 mm) for inserting the core 11a into a cylindrical ferrite material is formed.

The coil 116 may be wound over an entire length in an axial direction of the ferrite core 115, or may be wound over a partial length. The coil 116 is electrically connected to the capacitor 13.

The capacitor portion 13 may include a plurality of capacitors connected in parallel. Each of the capacitors on a printed circuit board may have different capacitance from each other, and may be trimmed within a manufacturing process.

As illustrated in FIG. 5B, an electrically coupled resonance (ECR) type of stylus pen 10b includes a conductive tip 11b and a resonance circuit 12. The resonance circuit 12 includes an inductor 14 and a capacitor 13. The inductor 14 includes a ferrite core 115 and a coil 116 wound on an outer surface of the ferrite core 115.

At least a portion of the conductive tip 11b may be formed of a conductive material (e.g., a metal, a conductive rubber, a conductive fabric, a conductive silicone, etc.), but the present invention is not limited thereto.

The coil 116 may be wound over an entire length in an axial direction of the ferrite core 115, or may be wound over a partial length. The coil 116 is electrically connected to the capacitor 13.

The capacitor portion 13 may include a plurality of capacitors connected in parallel. Each of the capacitors on a printed circuit board may have different capacitance from each other, and may be trimmed within a manufacturing process.

Hereinafter, a method of sensing a touch by using a resonance signal from the stylus pen described with reference to FIG. 5 will be described.

Figure 6:
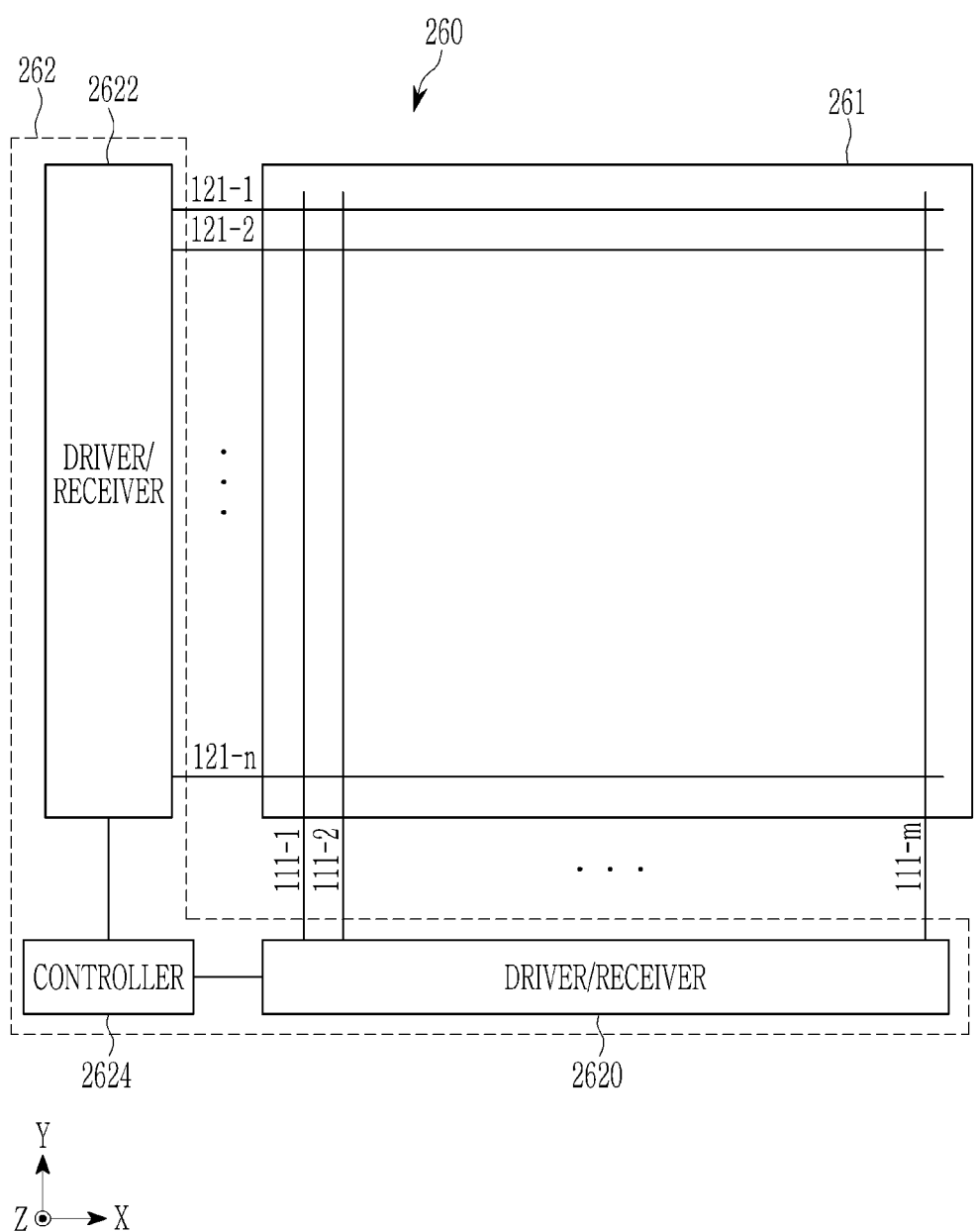
FIG. 6 schematically illustrates a portion of a touch device according to an embodiment.

FIG. 6 schematically illustrates a portion of a touch device according to an embodiment.

A touch module (i.e., touch device) 260 according to an embodiment includes a touch sensor 261 and a touch controller 262 for controlling the touch sensor 261. The touch controller 262 may include a first driver/receiver 2620 and a second driver/receiver 2622 for transmitting and receiving signals to and from the touch sensor 261, and a controller 2624.

The touch sensor 261 may include a plurality of first touch electrodes 111-1 to 111-m for sensing touch coordinates in a first direction; and a plurality of second touch electrodes 121-1 to 121-n for sensing touch coordinates in a second direction intersecting the first direction. For example, the first touch electrodes 111-1 to 111-m may have a shape extending in the second direction, and the second touch electrodes 121-1 to 121-n may have a shape extending in the first direction. In the touch sensor 261, the first touch electrodes 111-1 to 111-m may be arranged along the first direction, and the second touch electrodes 121-1 to 121-n may be arranged along the second direction.

The first driver/receiver 2620 may apply a driving signal to the first touch electrodes 111-1 to 111-m. The second driver/receiver 2622 may receive a sensing signal from the second touch electrodes 121-1 to 121-n.

Although it has been described above that the touch sensor 261 is implemented in a mutual capacitance method, the touch sensor 261 may be implemented in a self-capacitance method, and it will be easy for a person skilled in the art to appropriately modify the touch electrodes 111-1 to 111-m and 121-1 to 121-n, the first driver/receiver 2620 and the second driver/receiver 2622 in the mutual capacitance method, to add a new component, or to omit some components and to modify them to fit the self-capacitance method.

That is, the touch sensor 261 may include a plurality of self-capacitance touch electrodes, and in this case, the touch electrodes may be arranged in a dot shape, or may be arranged to have a shape extending in one direction as described above.

Next, an electrode and a trace will be described with reference to FIG. 7.

Figure 7:
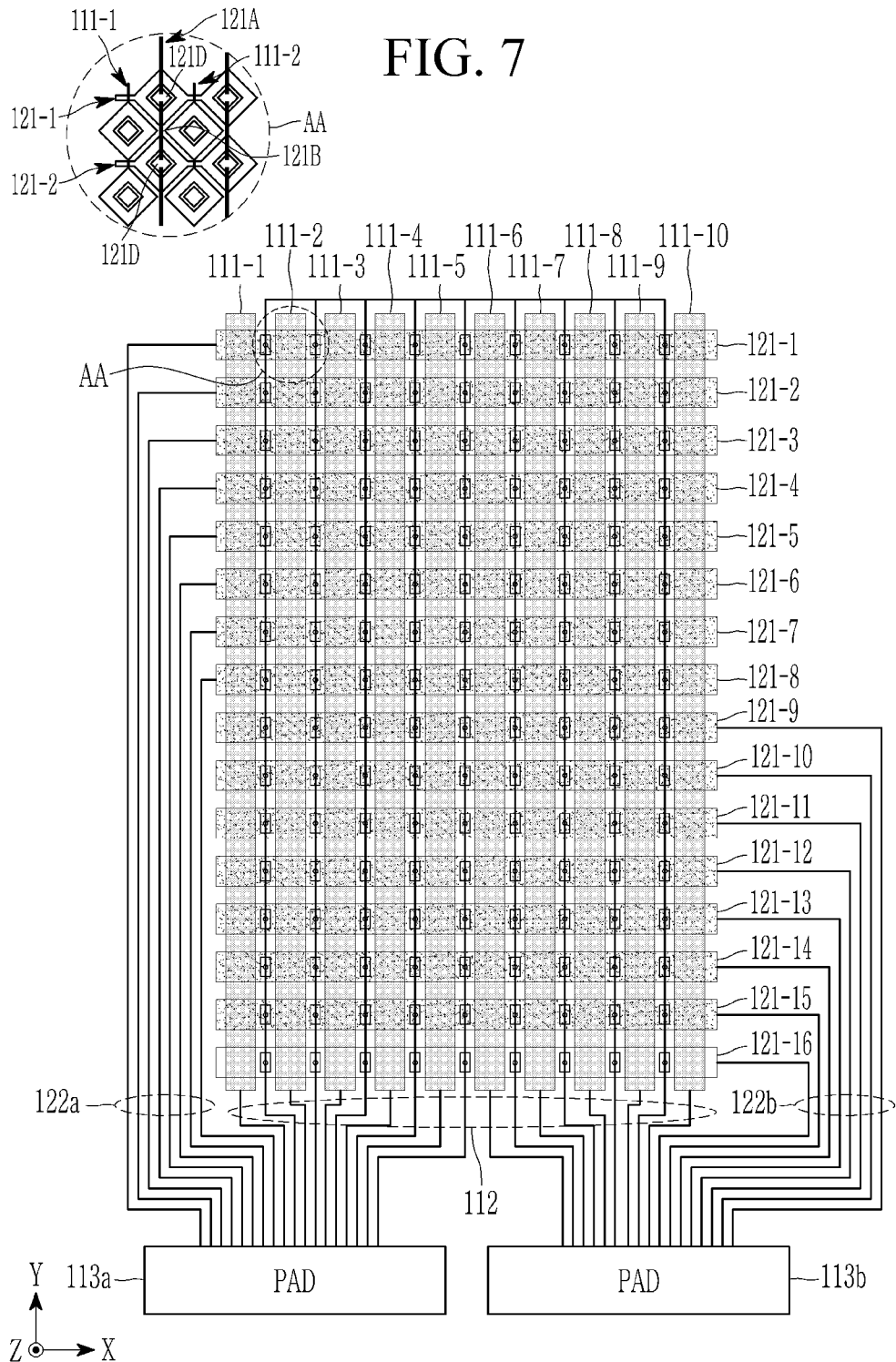
FIG. 7 illustrates an example of a disposal form of an electrode and a trace of a touch device according to an embodiment.

FIG. 7 illustrates an example of a disposal form of an electrode and a trace of a touch device according to an embodiment.

The touch sensor may include an antenna to which touch electrodes 111 and 121 and a dummy electrode are connected. For example, a plurality of dummy electrodes 121D may be positioned on a same layer as the touch electrodes 111 and 121, and some of the dummy electrodes 121D may be connected to each other by a bridge 121B. The bridge 121B may be connected to pads 113a and 113b through a trace 112.

The touch controller 262 may apply a driving signal to an antenna 121A to resonate the stylus pen 10. The driving signal may include a signal (e.g., a sine wave, a square wave, etc.) having a frequency corresponding to a resonance frequency of the resonance circuit 12, and may be an AC voltage or an AC current having a predetermined frequency. A frequency and magnitude of the driving signal may be changed under control of the controller 2624. Specifically, the touch controller 262 may apply a driving signal to one of two adjacent bridges 121B and ground the other.

The touch electrodes 111 and 121 are connected to pads 113a and 113b through traces 112, 122a, and 122b of a peripheral area positioned at an edge of a touch area. The first touch electrodes 111-1, 111-2, 111-3, . . . are connected to the respective traces 112, and the second touch electrodes 121-1, 121-2, 121-3, . . . are connected corresponding to the respective traces 122a and 122b.

The touch electrodes 111 and 121 and the traces 112, 122a, and 122b may be formed as a same layer. The touch electrodes 111 and 121 and the traces 112, 122a, and 122b may be formed of a conductive material exhibiting high transmittance and low impedance, such as a metal mesh or silver nanowire. However, the touch electrodes 111 and 121 and the traces 112, 122a, and 122b may be positioned in different layers, and may be made of ITO or graphene, but the present invention is not limited thereto.

The pads 113a and 113b are connected to the touch controller 262, a signal (e.g., a driving signal) of the touch controller 262 is transferred to the touch electrodes 111 and 121, and a signal (e.g., a sensing signal) from the touch electrodes 111 and 121 is transferred to the touch controller 262.

Figure 8:
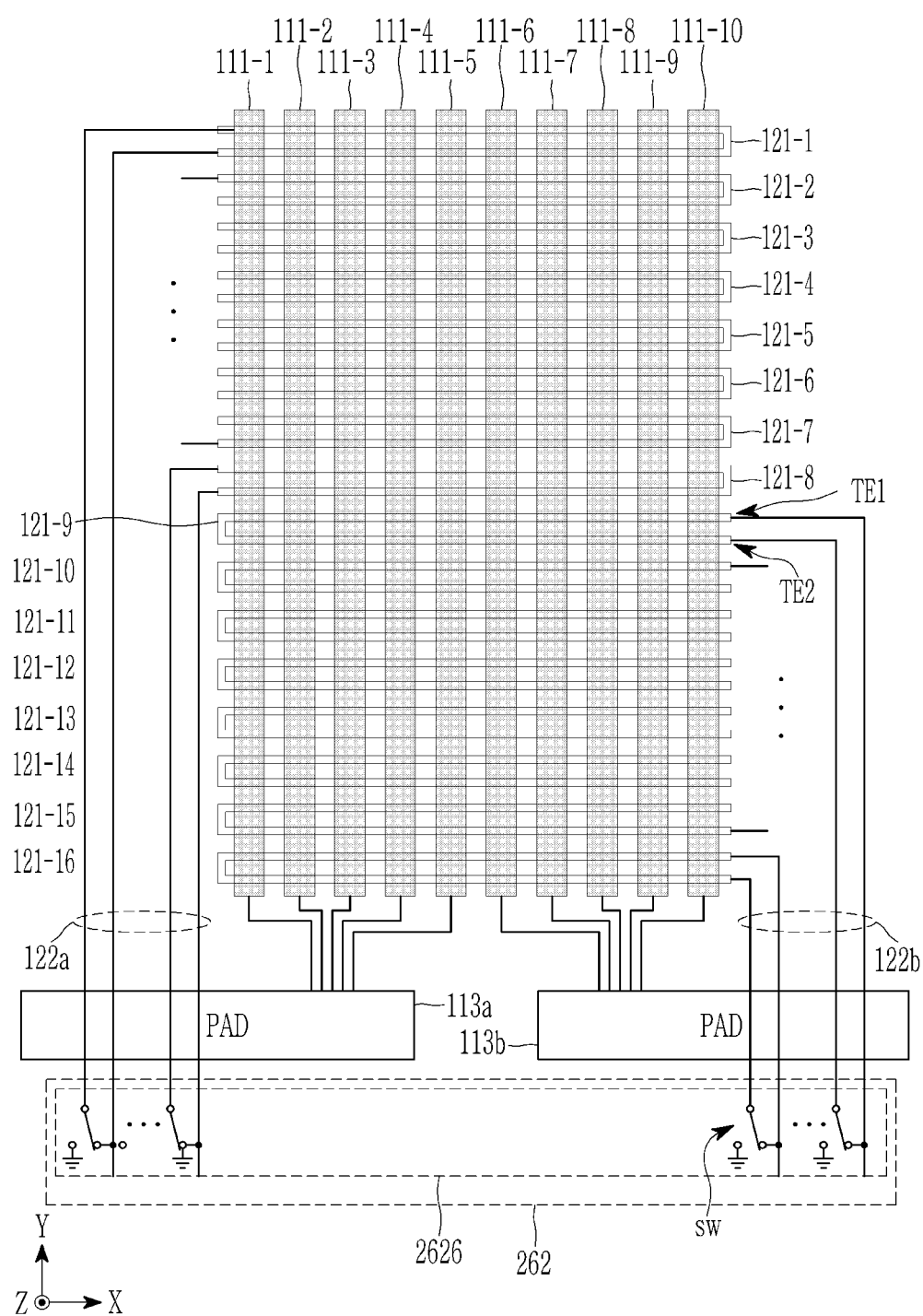
FIG. 8 illustrates another example of a disposal form of an electrode and a trace of a touch device according to an embodiment.

FIG. 8 illustrates another example of a disposal form of an electrode and a trace of a touch device according to an embodiment.

Similar to FIG. 7, the touch electrodes 111 and 121 are connected to pads 113a and 113b through traces 112, 122a, and 122b of a peripheral area positioned at an edge of a touch area.

One touch electrode has two signal input terminals, and the two signal input terminals are connected to correspond to two traces. For example, a second touch electrode 121-9, which is a "U"-shaped electrode, has a first signal input terminal TE1 positioned at an upper side and a second signal input terminal TE2 positioned at a lower side.

One of the two signal input terminals may be connected to a ground through a switch, or may be connected to the driver/receiver 2620. For example, the first signal input terminal TE1 is connected to the driver/receiver 2620, and the second signal input terminal TE2 is connected to the switch SW. The switch SW connects the second signal input terminal TE2 to the ground or the driver/receiver 2620.

The touch controller 262 may connect one signal input terminal to the ground, and may apply a driving signal in order to resonate the stylus pen 10. The touch controller 262 may receive simultaneously sensing signals from both signal input terminals. In addition, when driving for a general finger touch, the touch controller 262 may apply a driving signal of a same phase to both signal input terminals.

Although it has been described above that one signal input terminal is connected to the ground and a driving signal is applied, the touch controller 262 may apply a driving signal having opposite phases to the two signal input terminals.

Next, signals induced to the touch electrodes 111 and 121 and the traces 112, 122a, and 122b when the stylus pen 10a or 10b is positioned on the touch screen 20 will be described with reference to FIG. 9.

Figure 9:
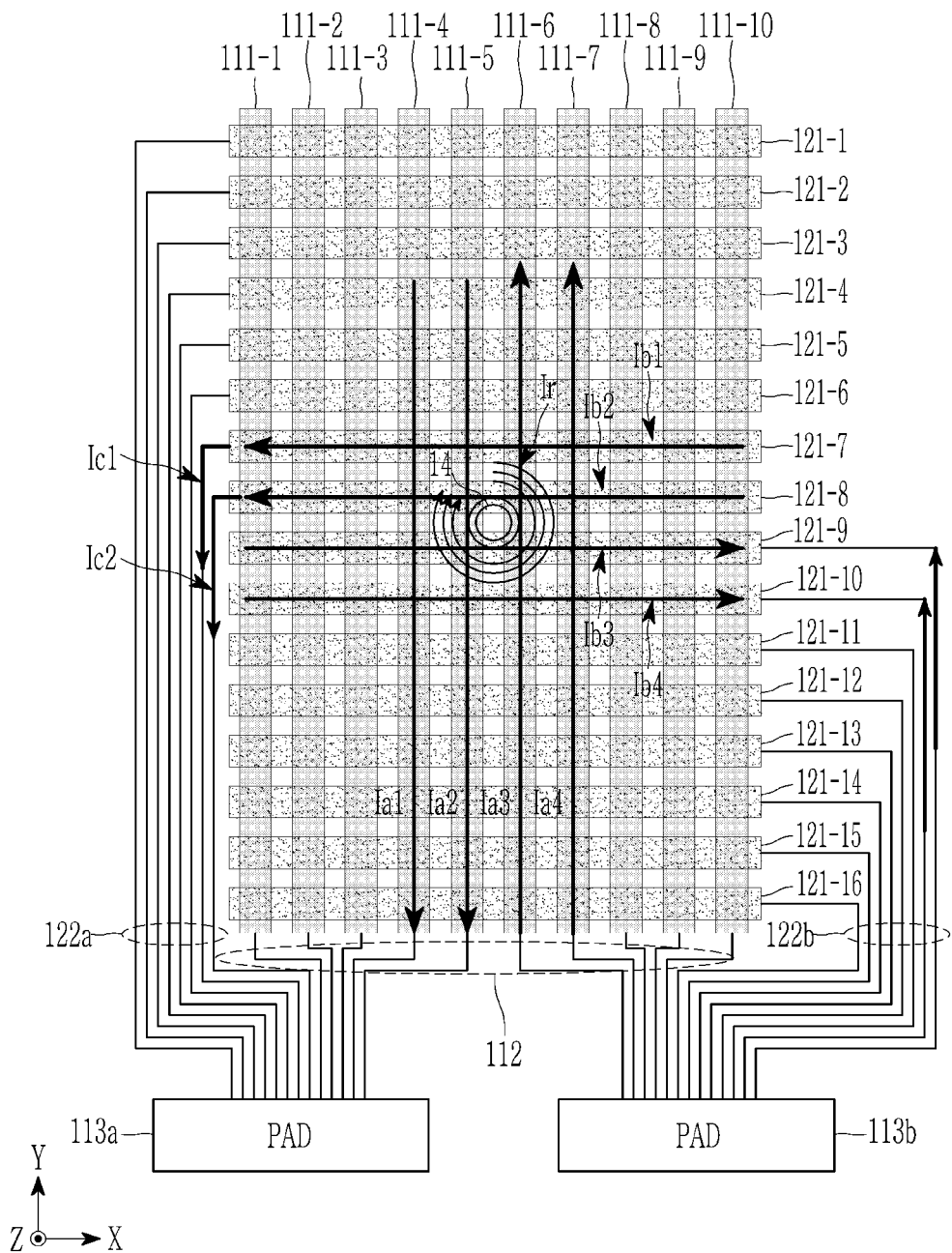
FIG. 9 illustrates a case in which a stylus pen is positioned on a touch device according to an embodiment.

FIG. 9 illustrates a case in which a stylus pen is positioned on a touch device according to an embodiment.

As illustrated in FIG. 9, the inductor 14 of the stylus pen 10a or 10b is positioned on the touch screen 20 between first touch electrodes 111-5 and 111-6 and between second touch electrodes 121-8 and 121-9.

The stylus pen 10a or 10b resonate by a driving signal applied to the antenna 121A or the touch electrodes 111 and 121 having two signal input terminals. A current Ir flowing through a coil of the inductor 14 flows by resonance. This current Ir causes eddy currents in the touch electrodes 111 and 121 and the traces 112, 122a, and 122b. These eddy currents are generated in a direction opposite to a direction of the current Ir.

Accordingly, currents Ia1 and Ia2 are generated in a −Y-axis direction in the first touch electrodes 111-4 and 111-5 positioned at a left side (−X-axis direction) of the inductor 14, and currents Ia3 and Ia4 are generated in a +Y-axis direction in the first touch electrodes 111-6 and 111-7 positioned at a right side (+X-axis direction) of the inductor 14. That is, a direction of the current induced to the first touch electrodes 111-1 to 111-5 and a direction of the current induced to the first touch electrodes 111-6 to 111-10 are opposite to each other.

Currents Ib1 and Ib2 are generated in the −X-axis direction in the second touch electrodes 121-7 and 121-8 positioned above the inductor 14 (+Y-axis direction), and currents Ib3 and Ib4 are generated in the +X-axis direction to the second touch electrodes 121-9 and 121-10 positioned below the inductor 14 (−Y-axis direction). That is, a direction of the current induced to the second touch electrodes 121-1 to 121-8 and a direction of the current induced to the second touch electrodes 121-9 to 121-16 are opposite to each other.

Currents Ic1 and Ic2 are generated in the −Y-axis direction in the traces 122a positioned at a left side of the inductor 14, and currents Ic3 and Ic4 are generated in the +Y-axis direction in the traces 122b positioned at a right side of the inductor 14. That is, a direction of the current induced in the traces 122a and a direction of the current induced in the traces 122b are opposite to each other.

In addition, the direction of the current induced to the second touch electrodes 121-1 to 121-8 and the direction of the current induced to the traces 122a connected to the second touch electrodes 121-1 to 121-8 is the same. The direction of the current induced to the second touch electrodes 121-9 to 121-16 and the direction of the current induced to the traces 122b connected to the second touch electrodes 121-9 to 121-16 are opposite to each other.

For the direction of the current at a point in time with respect to the pads 113a and 113b, a current may be introduced from the second touch electrodes 121-1 to 121-8 to the pad 113a. A current may be drawn out from the pad 113b to the second touch electrodes 121-9 to 121-16, or a current may be introduced into the pad 113b from the second touch electrodes 121-9 to 121-16 depending on a magnitude of the current induced in the second touch electrodes 121-9 to 121-16 and the traces 122b connected thereto. However, in FIG. 9, since the inductor 14 of the stylus pen 10 is positioned closer to the second touch electrodes 121-9 to 121-16 than the traces 122b, a current may be introduced into the pad 113b from the second touch electrodes 121-9 to 121-16.

Separately, in the case of the stylus pen 10b of FIG. 5B, since an electric field signal E is outputted to the touch electrodes 111 and 121, a sensing signal by the electric field signal E applied to the first touch electrodes 111-5 and 111-6 and the second touch electrodes 121-8 and 121-9 is received.

In this regard, referring to FIG. 10, a signal measurement method will be described.

Figure 10:
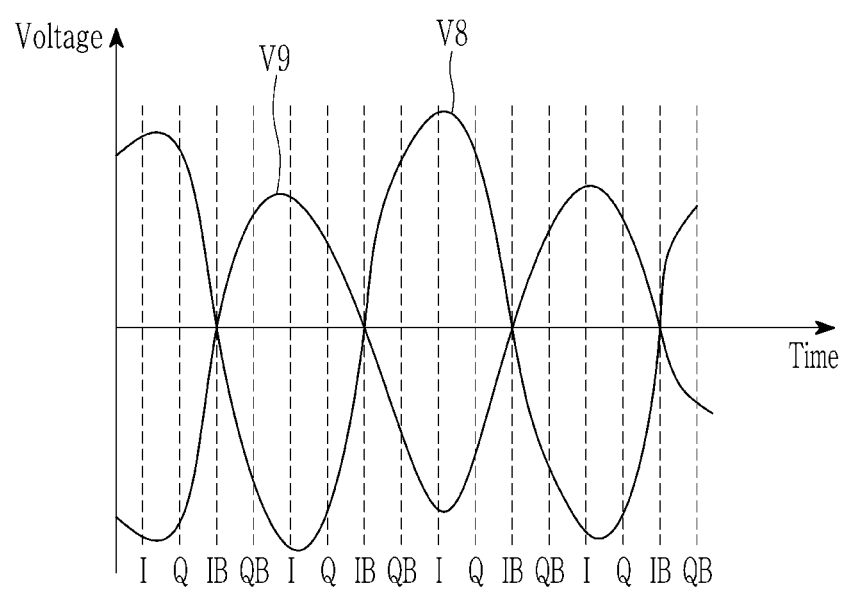
FIG. 10 illustrates a graph showing a signal measurement method of a touch device according to embodiments.

FIG. 10 illustrates a graph showing a signal measurement method of a touch device according to embodiments.

FIG. 10 illustrates a voltage change V8 of the second touch electrode 121-8 and a voltage change V9 of the second touch electrode 121-9 in which currents in opposite directions are induced.

The first driver/receiver 2620 and the second driver/receiver 2622 sample a voltage change corresponding to a frequency of a driving signal to measure a sensing signal depending on a voltage change. At least one sampling time point I, Q, IB, and QB may be any timing that may be periodically set in relation to the frequency of the driving signal. For example, a period between I and I is equal to a half period of the driving signal.

The sensing signal includes a difference ΔI between a voltage value measured at a time point I and a voltage value measured at a time point IB and/or a difference ΔQ between a voltage value measured at a time point Q and a voltage value measured at a time point QB.

Next, the sensing signal by the stylus pen 10b of FIG. 5B will be described with reference to FIG. 11 and FIG. 12.

Figure 11:
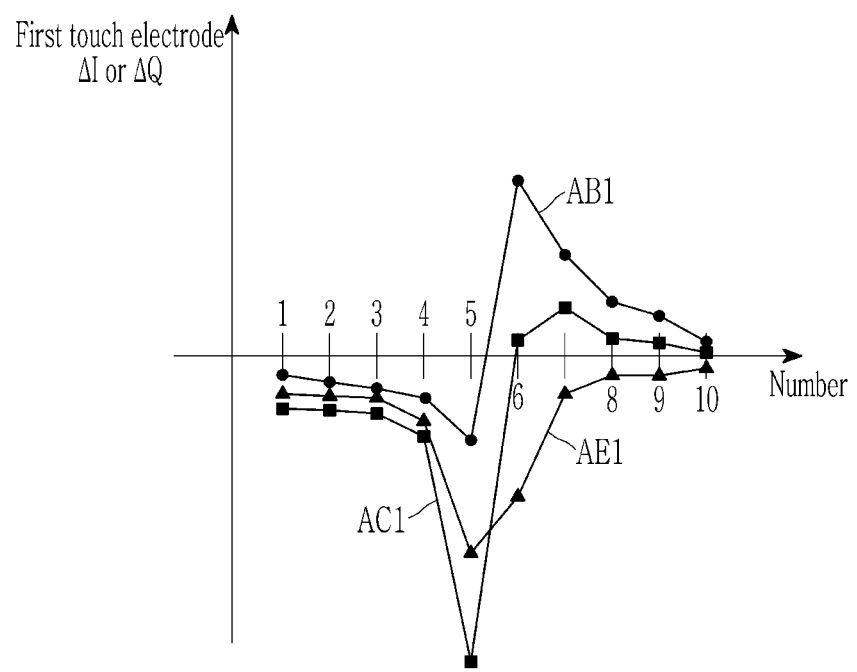
FIG. 11 and FIG. 12 each illustrate a graph showing a sensing signal by a stylus pen according to an embodiment.
Figure 12:
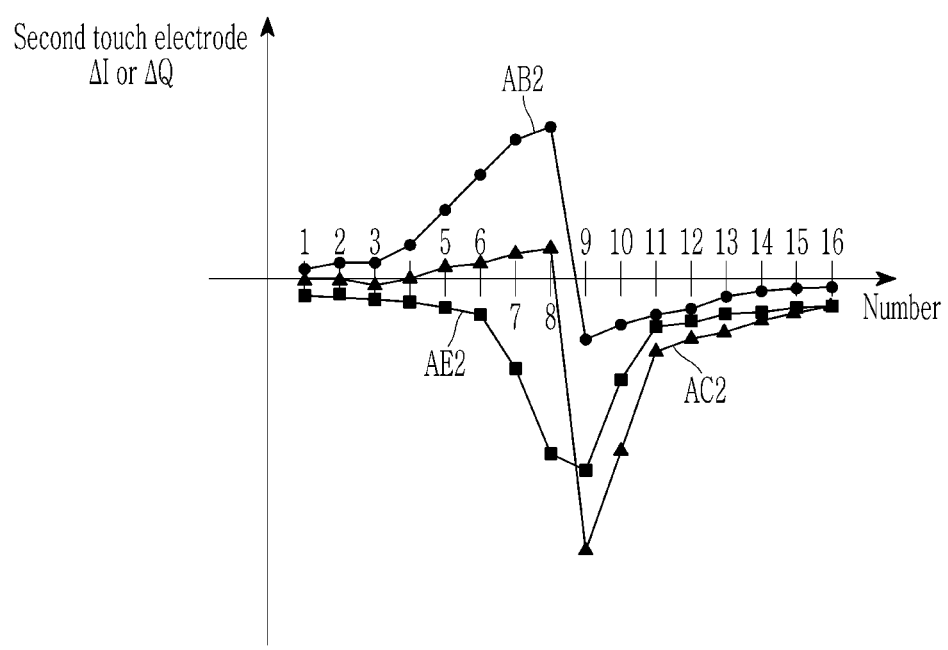

FIG. 11 and FIG. 12 each illustrate a graph showing a sensing signal by a stylus pen according to an embodiment.

FIG. 11 illustrates a graph of a sensing signal received from the first touch electrodes 111-1 to 111-10.

As illustrated in FIG. 11, a current direction between the first touch electrodes 111-1 to 111-5 and the first touch electrodes 111-6 to 111-10 is induced in an opposite direction, and accordingly, a sensing signal AB1 has opposite signs in the first touch electrode 111-5 and the first touch electrode 111-6. In addition, since a larger current will be induced as it is closer to the inductor 14, a magnitude of the current induced in the first touch electrode 111-5 and the first touch electrode 111-6 is larger than that of the current induced in the other first touch electrodes 111-1 to 111-4 and 111-7 to 111-10.

Since the stylus pen 10b outputs the electric field signal E to the first touch electrode 111-5 and the first touch electrode 111-6 through the conductive tip 11b, a sensing signal AE1 by this is received.

A sensing signal AC1 received by the first driver/receiver 2620 has a form in which the sensing signal AB1 and the sensing signal AE1 are combined. In this case, the controller 2624 may determine a gap between the two first touch electrodes 111-5 and 111-6 having a largest magnitude difference of the sensing signal AC1 as a touch point, and an exact touch point may be calculated by using interpolation or the like.

FIG. 12 illustrates a graph of a sensing signal received from the second touch electrodes 121-1 to 121-16.

As illustrated in FIG. 12, a current direction between the second touch electrodes 121-1 to 121-8 and the second touch electrodes 121-9 to 121-16 is induced in an opposite direction, and accordingly, a sensing signal AB2 measured thereby has opposite signs in the second touch electrode 121-8 and the second touch electrode 121-9. In addition, since a larger current will be induced as it is closer to the inductor 14, a magnitude of the current induced in the second touch electrode 121-8 and the second touch electrode 121-9 is larger than that of the current induced in the other second touch electrodes 121-1 to 121-7 and 121-10 to 121-16.

Since the stylus pen 10b outputs the electric field signal E to the second touch electrode 121-8 and the second touch electrode 121-9 through the conductive tip 11b, a sensing signal AE2 by this is received.

A sensing signal AC2 received by the second driver/receiver 2622 has a form in which the sensing signal AB2 and the sensing signal AE2 are combined. In this case, the controller 2624 may determine a touch point between the two second touch electrodes 121-8 and 121-9 having a largest magnitude difference of the sensing signal AC2 as a touch point, and an exact touch point may be calculated by using interpolation or the like.

Next, the sensing signal by the stylus pen 10a of FIG. 5A will be described with reference to FIG. 13 and FIG. 14.

Figure 13:
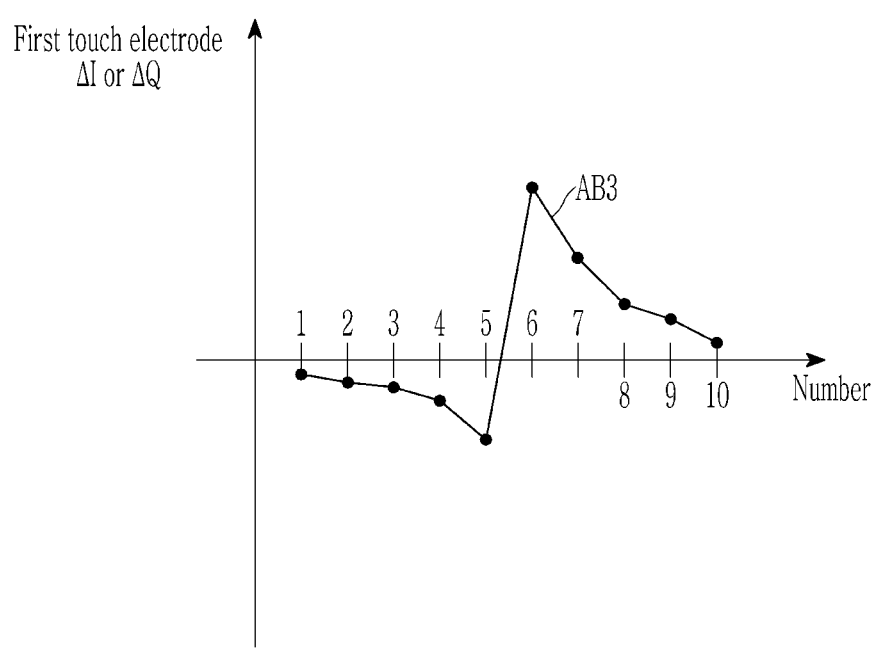
FIG. 13 and FIG. 14 each illustrate a graph showing a sensing signal by a stylus pen according to another embodiment.
Figure 14:
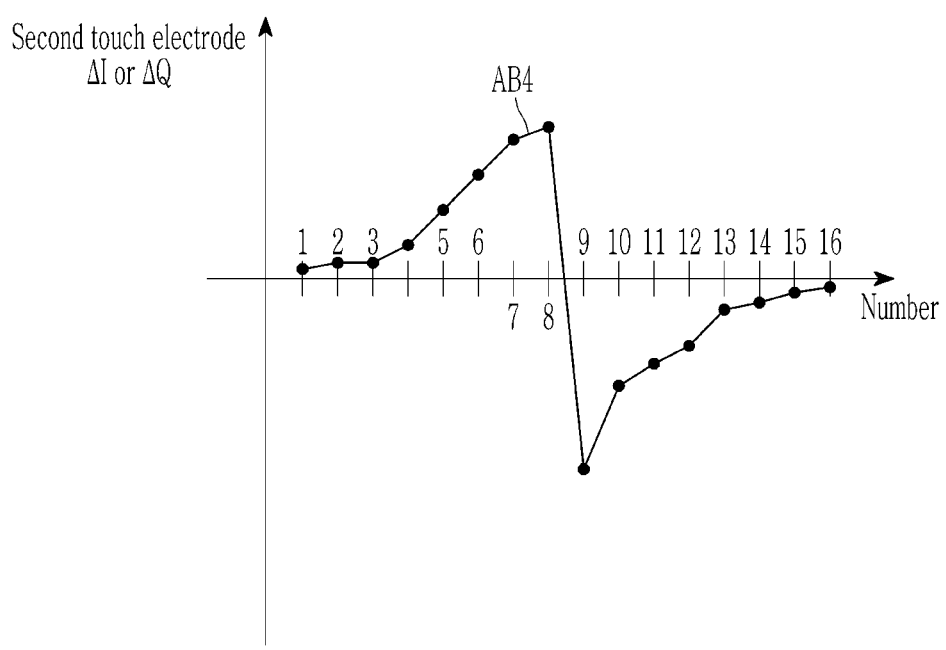

FIG. 13 and FIG. 14 each illustrate a graph showing a sensing signal by a stylus pen according to another embodiment.

FIG. 13 illustrates a graph of a sensing signal received from the first touch electrodes 111-1 to 111-10.

As illustrated in FIG. 13, a current direction between the first touch electrodes 111-1 to 111-5 and the first touch electrodes 111-6 to 111-10 is induced in an opposite direction, and accordingly, a sensing signal AB3 received by the first driver/receiver 2620 has opposite signs in the first touch electrode 111-5 and the first touch electrode 111-6. In addition, since a larger current will be induced as it is closer to the inductor 14, a magnitude of the current induced in the first touch electrode 111-5 and the first touch electrode 111-6 is larger than that of the current induced in the other first touch electrodes 111-1 to 111-4 and 111-7 to 111-10.

In this case, the controller 2624 may determine a gap between the two first touch electrodes 111-5 and 111-6 having opposite signs of the sensing signal AB3 and having large signal magnitudes as a touch point, and an exact touch point may be calculated by using interpolation or the like. In this case, the controller 2624 may differentiate the sensing signal AB3 to determine an area having a maximum value as the touch point.

FIG. 14 illustrates a graph of a sensing signal received from the second touch electrodes 121-1 to 121-16.

As illustrated in FIG. 14, a current direction between the second touch electrodes 121-1 to 121-8 and the second touch electrodes 121-9 to 121-16 is induced in an opposite direction, and accordingly, a sensing signal AB4 received by the second driver/receiver 2622 has opposite signs in the second touch electrode 121-8 and the second touch electrode 121-9. In addition, since a larger current will be induced as it is closer to the inductor 14, a magnitude of the current induced in the second touch electrode 121-8 and the second touch electrode 121-9 is larger than that of the current induced in the other second touch electrodes 121-1 to 121-7 and 121-10 to 121-16.

In this case, the controller 2624 may determine a gap between the two second touch electrodes 121-8 and 121-9 having opposite signs of the sensing signal AB4 and having large signal magnitudes as a touch point, and an exact touch point may be calculated by using interpolation or the like.

Next, signals induced to the touch electrodes 111 and 121 and the traces 112, 122a, and 122b when the stylus pen 10a or 10b is positioned on the touch screen 20 will be described with reference to FIG. 15.

Figure 15:
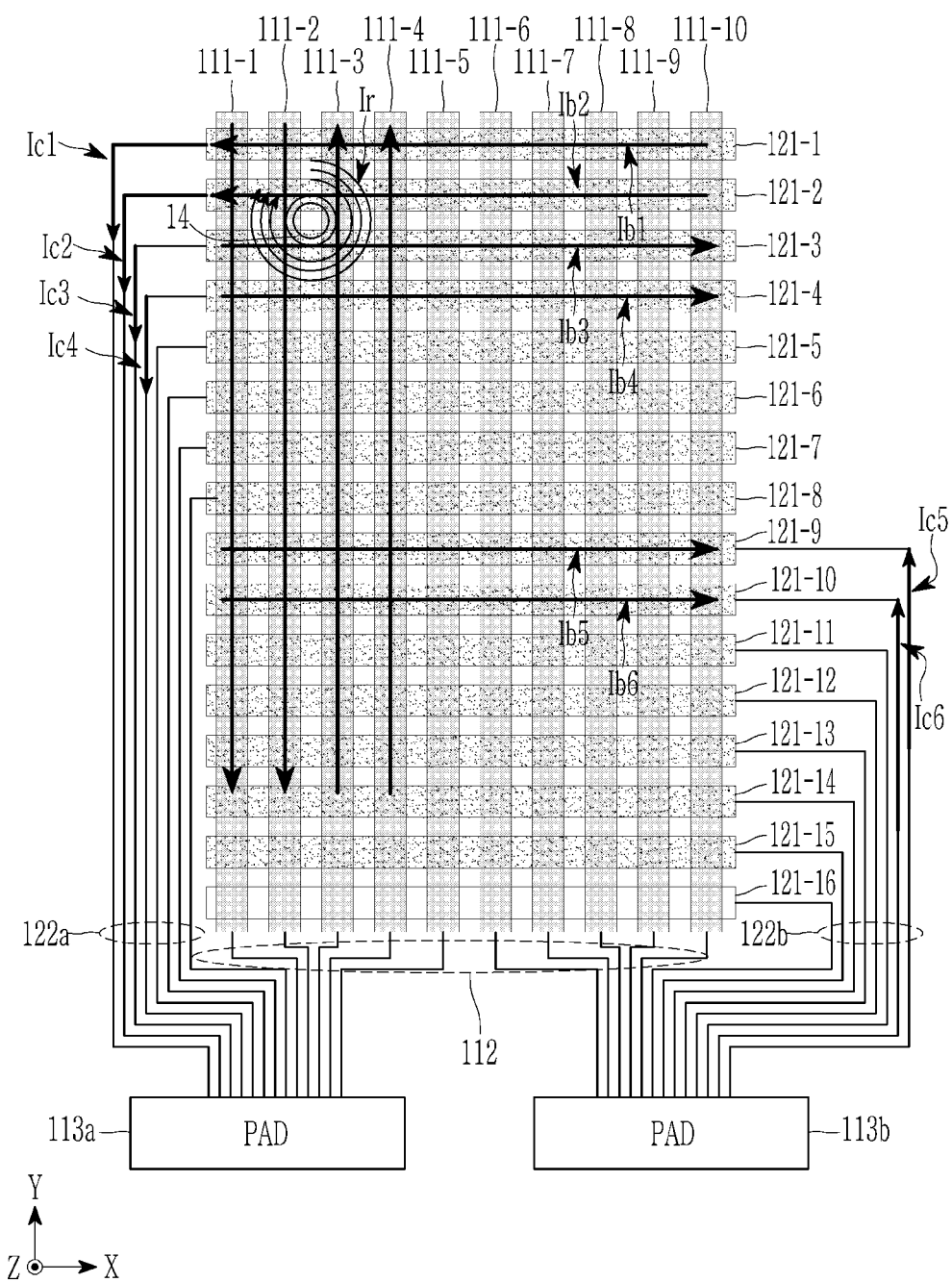
FIG. 15 illustrates a case in which a stylus pen is positioned on a touch device according to an embodiment.

FIG. 15 illustrates a case in which a stylus pen is positioned on a touch device according to an embodiment.

As illustrated in FIG. 15, the inductor 14 of the stylus pen 10a or 10b is positioned on the touch screen 20 between first touch electrodes 111-2 and 111-3 and between second touch electrodes 121-2 and 121-3.

The stylus pen 10a or 10b resonate by a driving signal applied to the antenna 121A or the touch electrodes 111 and 121 having two signal input terminals. A current Ir flowing through a coil of the inductor 14 flows by resonance. This current Ir causes eddy currents in the touch electrodes 111 and 121 and the traces 112, 122a, and 122b. These eddy currents are generated in a direction opposite to a direction of the current Ir.

Accordingly, currents Ia1 and Ia2 are generated in a −Y-axis direction in the first touch electrodes 111-1 and 111-2 positioned at a left side (−X-axis direction) of the inductor 14, and currents Ia3 and Ia4 are generated in a +Y-axis direction in the first touch electrodes 111-3 and 111-4 positioned at a right side (+X-axis direction) of the inductor 14. That is, a direction of the current induced to the first touch electrodes 111-1 and 111-2 and a direction of the current induced to the first touch electrodes 111-3 to 111-10 are opposite to each other.

Currents Ib1 and Ib2 are generated in the −X-axis direction in the second touch electrodes 121-1 and 121-2 positioned above the inductor 14 (+Y-axis direction), and currents Ib3, ib4, Ib5, and ib6 are generated in the +X-axis direction to the second touch electrodes 121-3, 121-4, 121-9, and 121-10 positioned below the inductor 14 (−Y-axis direction). That is, a direction of the current induced to the second touch electrodes 121-1 and 121-2 and a direction of the current induced to the second touch electrodes 121-3 to 121-16 are opposite to each other.

Currents Ic1 to Ic4 are generated in the −Y-axis direction in the traces 122a positioned at a left side of the inductor 14, and currents Ic5 and Ic6 are generated in the +Y-axis direction in the traces 122b positioned at a right side of the inductor 14. That is, a direction of the current induced in the traces 122a and a direction of the current induced in the traces 122b are opposite to each other.

In addition, the direction of the current induced to the second touch electrodes 121-1 and 121-2 and the direction of the current induced to the traces 122a connected to the second touch electrodes 121-1 and 121-2 is the same. The direction of the current induced to the second touch electrodes 121-3 to 121-8 and the direction of the current induced to the traces 122a connected to the second touch electrodes 121-3 to 121-8 are opposite to each other. The direction of the current induced to the second touch electrodes 121-9 to 121-16 and the direction of the current induced to the traces 122b connected to the second touch electrodes 121-9 to 121-16 are opposite to each other.

For the direction of the current at a point in time with respect to the pads 113a and 113b, a current may be introduced from the second touch electrodes 121-1 and 121-2 to the pad 113a. A current may be drawn out from the pad 113a and 113b to the second touch electrodes 121-3 to 121-16, or a current may be introduced into the pad 113a and 113b from the second touch electrodes 121-3 to 121-16 depending on a magnitude of the current induced in the second touch electrodes 121-3 to 121-16 and the traces 122a and 122b connected thereto.

Separately, in the case of the stylus pen 10b of FIG. 5B, since an electric field signal E is outputted to the touch electrodes 111 and 121, a sensing signal by the electric field signal E applied to the first touch electrodes 111-2 and 111-3 and the second touch electrodes 121-2 and 121-3 is received.

Next, the detection signal by the stylus pen 10b of FIG. 5B will be described with reference to FIG. 16 and FIG. 17.

Figure 16:
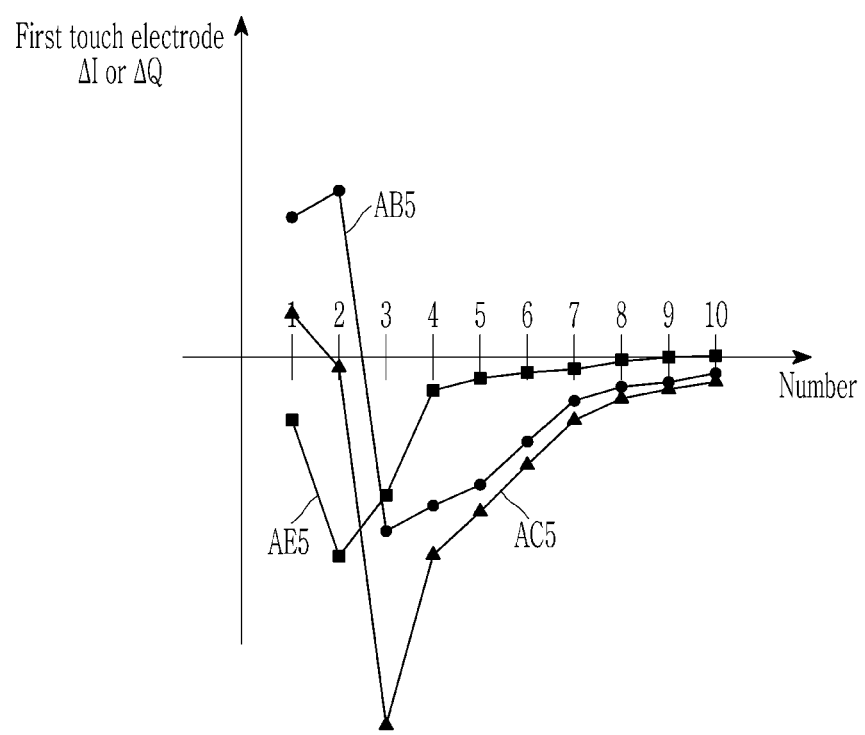
FIG. 16 and FIG. 17 each illustrate a graph showing a sensing signal by a stylus pen according to an embodiment.
Figure 17:
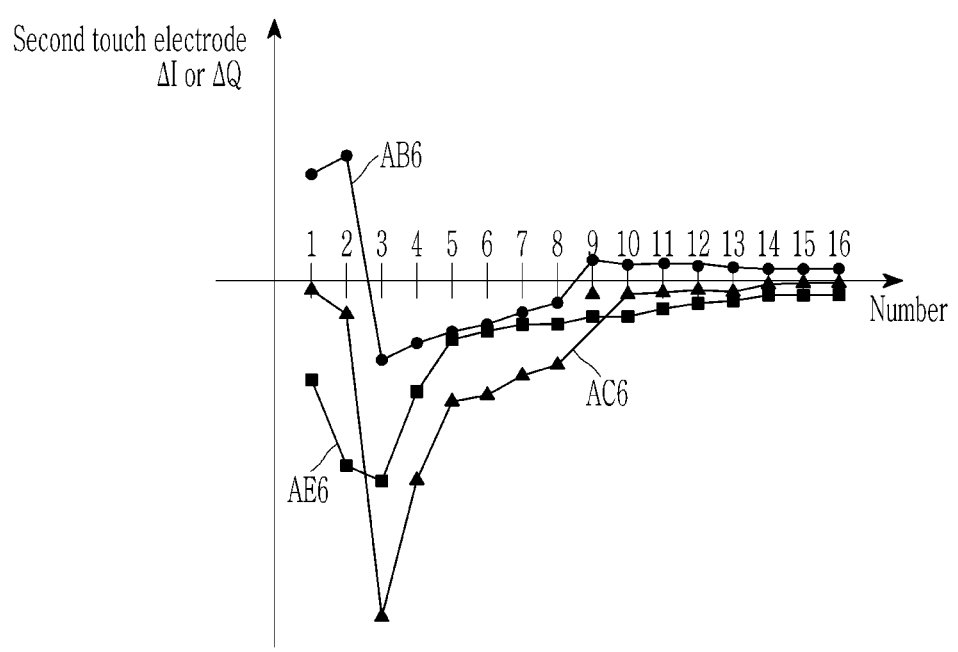

FIG. 16 and FIG. 17 each illustrate a graph showing a sensing signal by a stylus pen according to an embodiment.

As illustrated in FIG. 16, a current direction between the first touch electrodes 111-1 and 111-2 and the first touch electrodes 111-3 to 111-10 is induced in an opposite direction, and accordingly, a sensing signal AB5 has opposite signs in the first touch electrode 111-2 and the first touch electrode 111-3. In addition, since a larger current will be induced as it is closer to the inductor 14, a magnitude of the current induced in the first touch electrode 111-2 and the first touch electrode 111-3 is larger than that of the current induced in the other first touch electrodes 111-1 and 111-4 to 111-10.

Since the stylus pen 10*b* outputs the electric field signal E to the first touch electrode 111-2 and the first touch electrode 111-3 through the conductive tip 11*b*, a sensing signal AE5 by this is received.

A sensing signal AC5 received by the first driver/receiver 2620 has a form in which the sensing signal AB5 and the sensing signal AE5 are combined. In this case, the controller 2624 may determine a gap between the two first touch electrodes 111-2 and 111-3 having a largest magnitude difference of the sensing signal AC5 as a touch point, and an exact touch point may be calculated by using interpolation or the like.

FIG. 17 illustrates a graph of a sensing signal received from the second touch electrodes 121-1 to 121-16.

As illustrated in FIG. 17, a current direction between the second touch electrodes 121-1 and 121-2 and the second touch electrodes 121-3 to 121-16 is induced in an opposite direction, and accordingly, a sensing signal AB6 measured thereby has opposite signs in the second touch electrode 121-2 and the second touch electrode 121-3. In addition, since a larger current will be induced as it is closer to the inductor 14, a magnitude of the current induced in the second touch electrode 121-2 and the second touch electrode 121-3 is larger than that of the current induced in the other second touch electrodes 121-1 and 121-4 to 121-16.

Since the stylus pen 10*b* outputs the electric field signal E to the second touch electrode 121-2 and the second touch electrode 121-3 through the conductive tip 11*b*, a sensing signal AE6 by this is received.

A sensing signal AC6 received by the second driver/receiver 2622 has a form in which the sensing signal AB6 and the sensing signal AE6 are combined. In this case, the controller 2624 may determine a touch point between the two second touch electrodes 121-2 and 121-3 having a largest magnitude difference of the sensing signal AC6 as a touch point, and an exact touch point may be calculated by using interpolation or the like.

Next, the sensing signal by the stylus pen 10*a* of FIG. 5A will be described with reference to FIG. 18 and FIG. 19.

Figure 18:
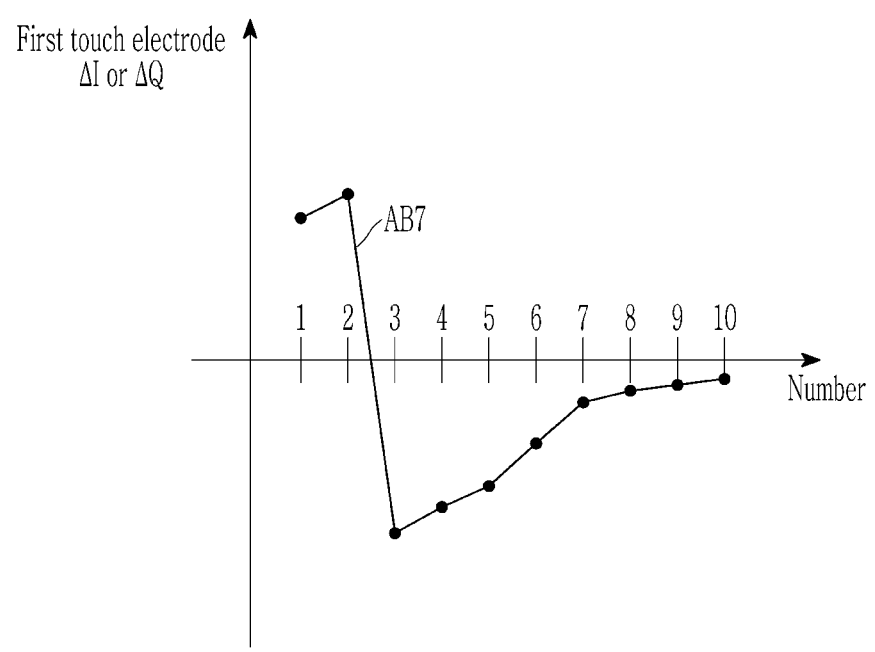
FIG. 18 and FIG. 19 each illustrate a graph showing a sensing signal by a stylus pen according to another embodiment.
Figure 19:
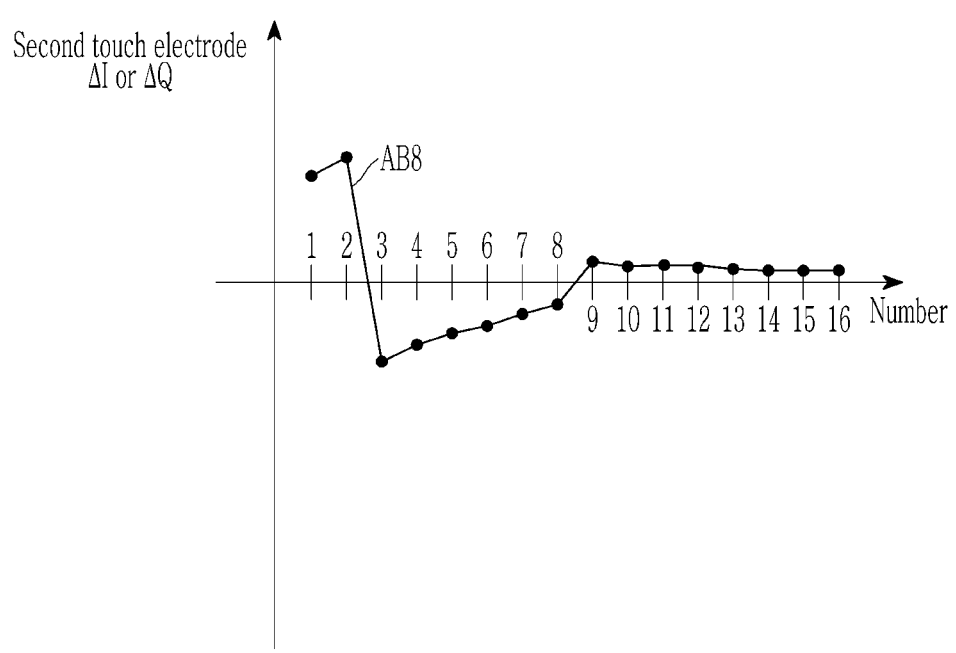

FIG. 18 and FIG. 19 each illustrate a graph showing a sensing signal by a stylus pen according to another embodiment.

FIG. 18 illustrates a graph of a sensing signal received from the first touch electrodes 111-1 to 111-10.

As illustrated in FIG. 18, a current direction between the first touch electrodes 111-1 and 111-2 and the first touch electrodes 111-3 to 111-10 is induced in an opposite direction, and accordingly, a sensing signal AB7 received by the first driver/receiver 2620 has opposite signs in the first touch electrode 111-2 and the first touch electrode 111-3. In addition, since a larger current will be induced as it is closer to the inductor 14, a magnitude of the current induced in the first touch electrode 111-2 and the first touch electrode 111-3 is larger than that of the current induced in the other first touch electrodes 111-1 and 111-4 to 111-10.

In this case, the controller 2624 may determine a gap between the two first touch electrodes 111-2 and 111-3 having opposite signs of the sensing signal AB7 and having large signal magnitudes as a touch point, and an exact touch point may be calculated by using interpolation or the like.

FIG. 19 illustrates a graph of a sensing signal received from the second touch electrodes 121-1 to 121-16.

As illustrated in FIG. 19, a current direction between the second touch electrodes 121-1 and 121-2 and the second touch electrodes 121-3 to 121-16 is induced in an opposite direction, and accordingly, a sensing signal AB8 received by the second driver/receiver 2622 has opposite signs in the second touch electrode 121-2 and the second touch electrode 121-3. In addition, since a larger current will be induced as it is closer to the inductor 14, a magnitude of the current induced in the second touch electrode 121-2 and the second touch electrode 121-3 is larger than that of the current induced in the other second touch electrodes 121-1 and 121-4 to 121-16.

In this case, the controller 2624 may determine a gap between the two second touch electrodes 121-2 and 121-3 having opposite signs of the sensing signal AB8 and having large signal magnitudes as a touch point, and an exact touch point may be calculated by using interpolation or the like.

Next, the electronic device 2 having the touch screen 20*c* of FIG. 2C will be described with reference to FIG. 20.

Figure 20:
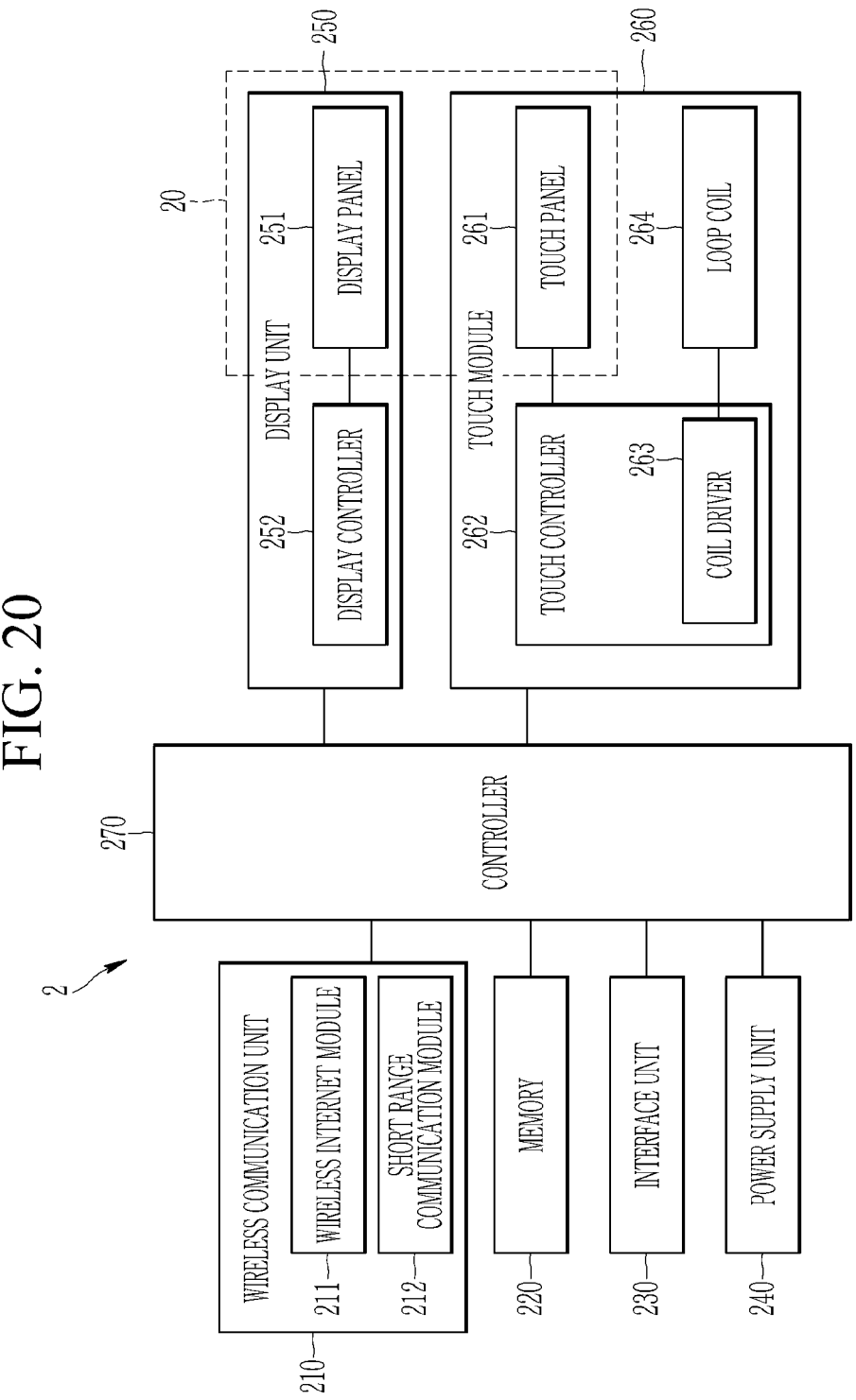
FIG. 20 illustrates a block diagram schematically showing an electronic device.

FIG. 20 illustrates a block diagram schematically showing an electronic device.

The electronic device of FIG. 20 further includes a loop coil 264 and a coil driver 263 for applying a driving signal to the loop coil 264 compared to the electronic device of FIG. 4.

The loop coil 264 may be positioned around the touch screen 20, or may be positioned at any position in the electronic device 2. The loop coil 264 may also be configured as an antenna of the short-distance communication module 212 such as RFID or NFC. The driving signal includes an alternating current or alternating voltage having a predetermined frequency.

Figure 21:
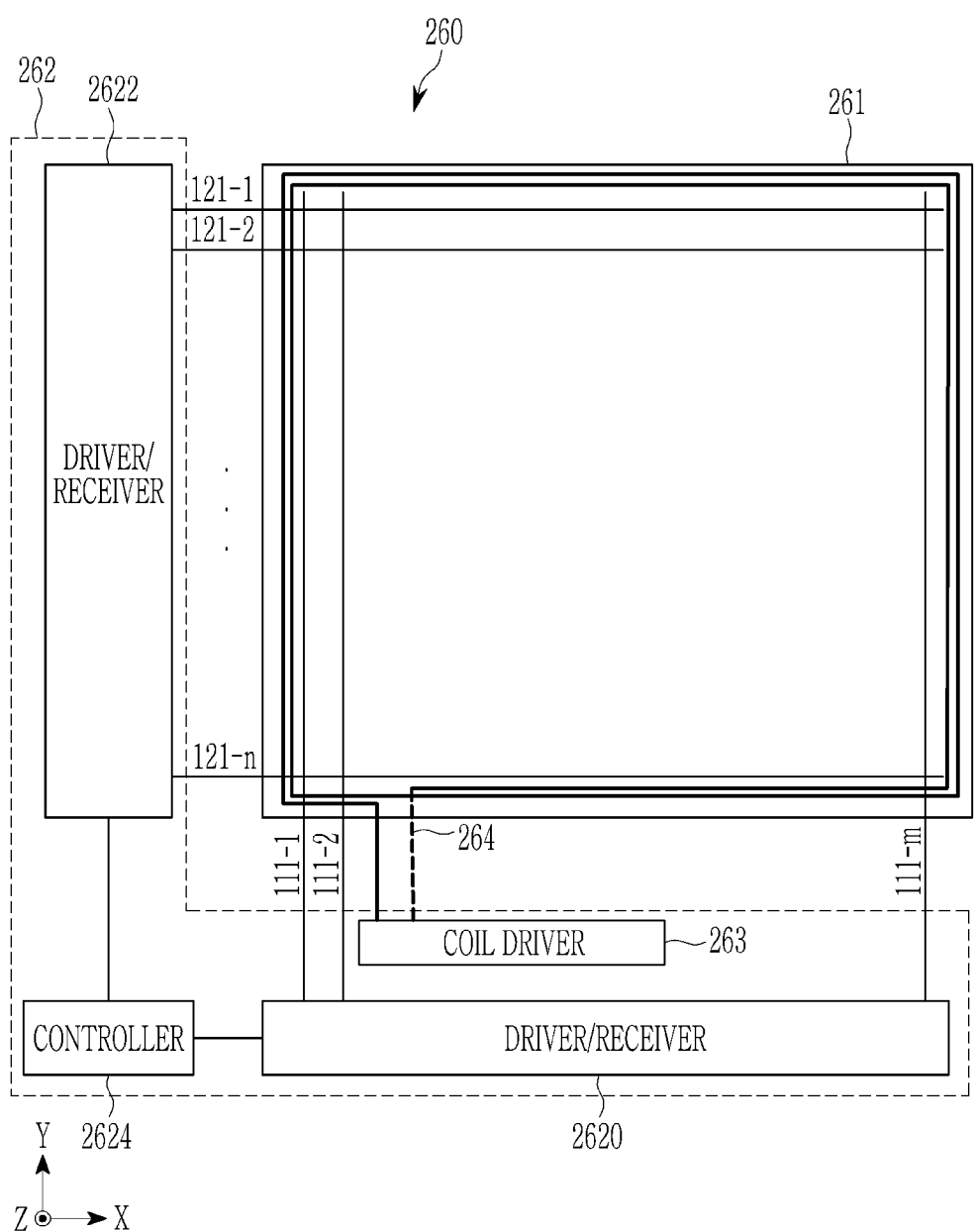
FIG. 21 schematically illustrates a portion of a touch device according to another embodiment.

FIG. 21 schematically illustrates a portion of a touch device according to an embodiment.

The touch device of FIG. 21 further includes a loop coil 264 and a coil driver 263 for driving the loop coil 264 compared to the touch device of FIG. 6.

The coil driver 263 applies a driving signal to the loop coil 264. The driving signal may include a signal (e.g., a sine wave, a square wave, etc.) having a frequency corresponding to a resonance frequency of the resonance circuit 12, and may be an AC voltage or an AC current having a predetermined frequency. A frequency and magnitude of the driving signal may be changed under control of the controller 2624.

The stylus pen 10*a* or 10*b* resonate by the driving signal applied to the loop coil 264. A current Ir flowing through a coil of the inductor 14 flows by resonance.

Figure 22:
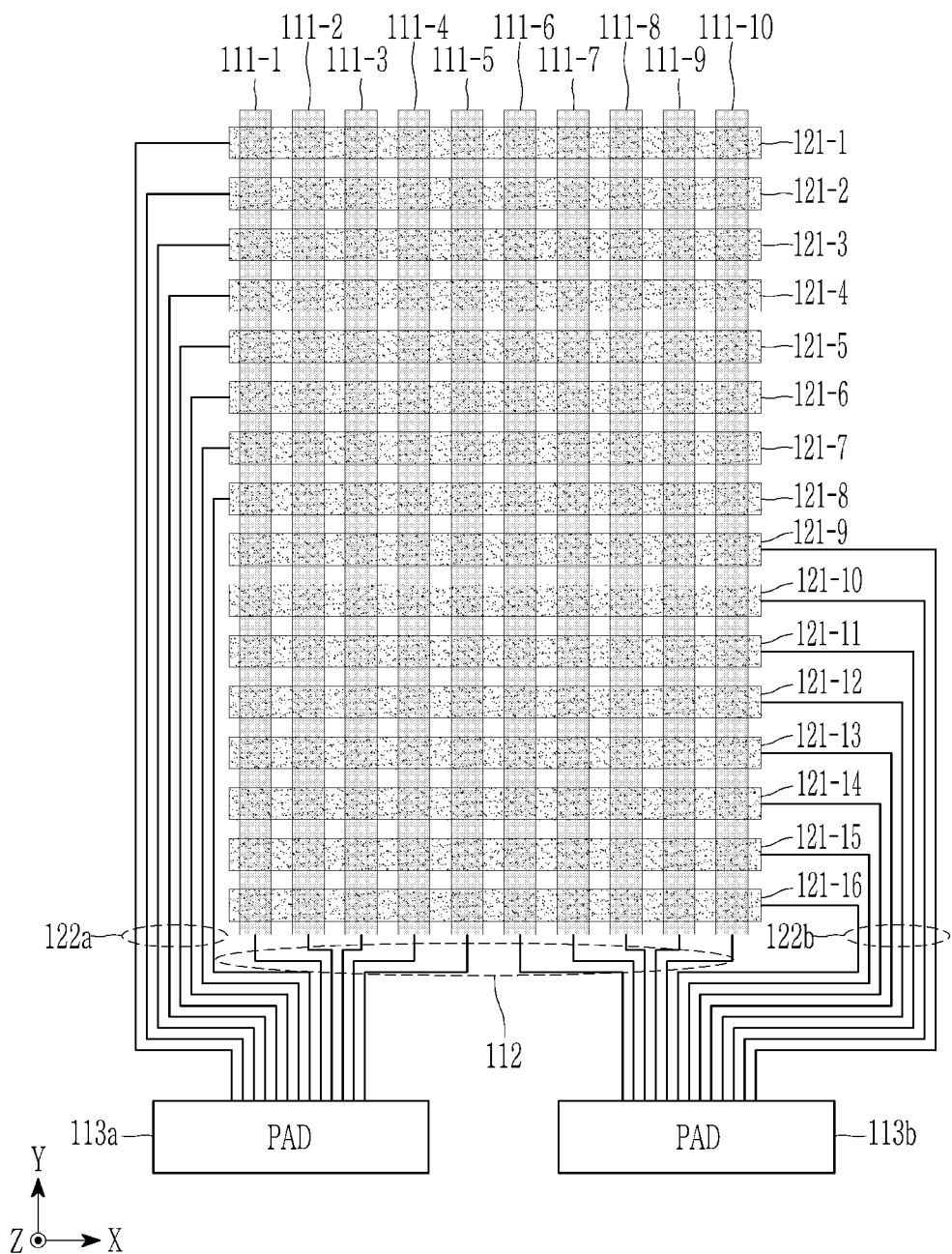
FIG. 22 illustrates an example of a disposal form of an electrode and a trace of a touch device according to another embodiment.

FIG. 22 illustrates an example of a disposal form of an electrode and a trace of a touch device according to another embodiment.

The touch electrodes 111 and 121 in the touch sensor are connected to pads 113*a* and 113*b* through traces 112, 122*a*, and 122*b* of a peripheral area positioned at an edge of a touch area. The first touch electrodes 111-1, 111-2, 111-3, . . . are connected to the respective traces 112, and the second touch electrodes 121-1, 121-2, 121-3, . . . are connected corresponding to the respective traces 122*a* and 122*b*.

The touch electrodes 111 and 121 and the traces 112, 122*a*, and 122*b* may be formed as a same layer. The touch electrodes 111 and 121 and the traces 112, 122*a*, and 122*b* may be formed of a conductive material exhibiting high transmittance and low impedance, such as a metal mesh or silver nanowire. However, the touch electrodes 111 and 121 and the traces 112, 122*a*, and 122*b* may be positioned in different layers, and may be made of ITO or graphene, but the present invention is not limited thereto.

The pads 113a and 113b are connected to the touch controller 262, a signal (e.g., a driving signal) of the touch controller 262 is transferred to the touch electrodes 111 and 121, and a signal (e.g., a sensing signal) from the touch electrodes 111 and 121 is transferred to the touch controller 262.

Figure 23:
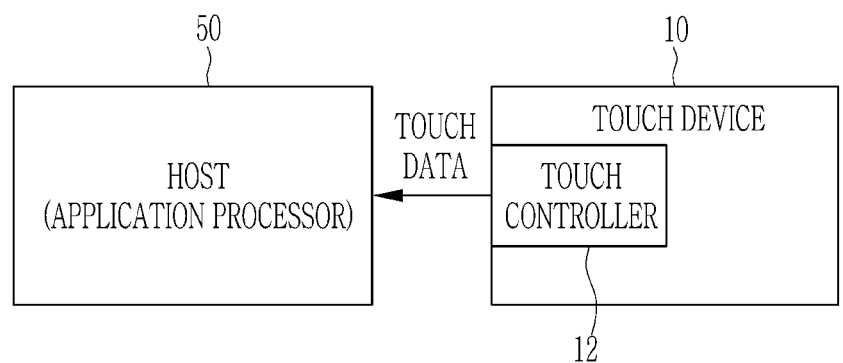
FIG. 23 illustrates a block diagram showing a touch module and a host.
Figure 24:
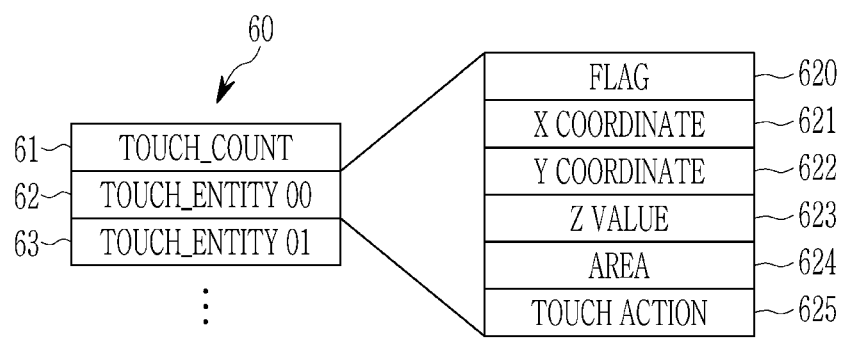
FIG. 24 illustrates an example of touch data provided to a host from a touch module.

FIG. 23 illustrates a block diagram showing a touch module and a host, and FIG. 24 illustrates an example of touch data provided to a host from a touch module.

Referring to FIG. 23, a host 270 may receive touch data from the touch controller 262 included in the touch module 260. For example, the host 270 may be a mobile system-on-chip (SoC), an application processor (AP), a media processor, a microprocessor, a central processing unit (CPU), or a device similar thereto.

After one frame ends, the touch module 260 may generate information related to the touch input during one frame as touch data to transfer it to the host 270.

Referring to FIG. 23 and FIG. 24, touch data 600 may be transferred from the touch module 260 to the host 270, and may include a touch count field 610 and one or more touch entity fields 612 and 614. In addition, the touch data 600 may further include sensor input data from the stylus pen 10, data indicating a change of a resonance signal, and the like.

In the touch count field 610, a value indicating a number of touches that are inputted during one frame period may be written. The touch entity fields 612 and 614 include fields indicating information related to each touch input. For example, the touch entity fields 612 and 614 may include a flag field 620, an X-axis coordinate field 621, a Y-axis coordinate field 622, a Z-value field 623, an area field 624, and a touch action field 625.

A number of the touch entity fields 612 and 614 may be equal to a value written in the touch count field 610.

A value representing a touch object may be written in the flag field 620. For example, a finger, a palm, and a stylus pen may be filled in the flag field 620 with different values. Values representing the calculated touch coordinates may be written in the X-axis coordinate field 621 and the Y-axis coordinate field 622. A value corresponding to the signal strength of the sensing signal may be written in the Z-value field 623. A value corresponding to an area of the touched area may be written in the area field 624.

According to embodiments, the host 270 receiving touch data 600 determines that a touch object is the finger when the touch area is larger than the threshold by using the value of the area field 624, and determines that the touch object is the stylus pen 10 when the touch area is less than or equal to the threshold.

According to the embodiments, the host 270 receiving the touch data 600 may identify whether the touch object is the finger or the stylus pen 10 by using the value of the flag field 620.

The electronic device according to various embodiments disclosed in this document may be various types of apparatus. The electronic device may include, e.g., a portable communication device (e.g., a smart phone), a computer device, a portable multimedia device, a portable medical device, a camera, a wearable device, or a home appliance device. The electronic device according to the embodiments of the present document is not limited to the above-described devices.

The various embodiments of this document and the terms used therein are not intended to limit the technical features described in this document to specific embodiments, and should be understood to include various modifications, equivalents, or substitutions of the embodiments. In connection with the description of the drawings, like reference numerals may be used for similar or related components. The singular form of the noun corresponding to the item may include one or more of the item, unless the relevant context clearly dictates otherwise. As used herein, each of the phrases "A or B", "at least one of A and B", "at least one of A or B," "A, B or C," "at least one of A, B, and C," and "at least one of A, B, or C" may include all possible combinations of the items listed together in the corresponding one of the phrases. Terms such as "1st", "2nd", "first", or "second" may simply be used to distinguish a component from another component, and the component is not limited in another aspect (e.g., importance or order). When one (e.g., first) component is "coupled" or "connected" to another (e.g., second) component, with or without the terms "functionally" or "communicatively", this indicates that one component may be connected to the other component directly (e.g., by wire), wirelessly, or through a third component.

As used herein, the term "module" may include a unit implemented in hardware, software, or firmware, and may be used interchangeably with terms such as, e.g., logic, logic block, component, or circuit. A module may be an integrally formed part or a minimum unit or a portion of the part that performs one or more functions. For example, according to an embodiment, the module may be implemented in the form of an application-specific integrated circuit (ASIC).

Various embodiments of the present document may be implemented as software (e.g., a program) including one or more commands stored in a storage medium (e.g., internal memory or external memory) readable by a machine (e.g., an electronic device). For example, a processor (e.g., processor) of a device (e.g., an electronic device) may call one or more commands stored from a storage medium and execute it. This makes it possible for the device to be operated to perform one or more functions depending on the called one or more commands. The one or more commands may include codes generated by a compiler or executable by an interpreter. The device-readable storage medium may be provided in the form of a non-transitory storage medium. Herein, 'non-transitory' only indicates that the storage medium is a tangible device and does not include a signal (e.g., electromagnetic wave), and this term does not distinguish between a case in which data is stored semi-permanently in a storage medium and a case in which data is temporarily stored therein.

According to an embodiment, the method according to various embodiments disclosed in this document may be provided as being included in a computer program product. A computer program product may be traded between a seller and a buyer as a commodity. The computer program product may be distributed in the form of a machine-readable storage medium (e.g., compact disc read only memory (CD-ROM)), or may be distributed (e.g., downloaded or uploaded) via an application store (e.g., Play Store™), directly between two user devices (e.g., smart phones), or in an online manner. In the case of online distribution, at least a part of the computer program product may be at least temporarily stored or temporarily created in a machine-readable storage medium such as a memory of a server of a manufacturer, a server of an application store, or a memory of a relay server.

According to various embodiments, each component (e.g., a module or a program) of the above-described components may include a singular entry or a plurality of entities. According to various embodiments, one or more components or operations among the above-described corresponding components may be omitted, or one or more other components or operations may be added. Alternatively or additionally, a plurality of components (e.g., a module or a program) may be integrated into one component. In this case, the integrated component may perform one or more functions of each component of the plurality of components identically or similarly to being performed by the corresponding component among the plurality of components prior to the integration. According to various embodiments, operations performed by a module, program, or other component may be executed sequentially, in parallel, repeatedly, or heuristically, one or more of the operations may be executed in a different order or may be omitted, or one or more other operations may be added.

What is claimed is:

1. A touch device for sensing a position of a stylus including a resonance circuit, comprising:
    a display panel;
    a window positioned on the display panel;
    a plurality of electrodes positioned between the display panel and the window; and
    a touch controller configured to receive a sensing signal from the electrodes to determine a position of the stylus close to the window,
    wherein directions of currents induced in two electrodes of the plurality of electrodes by the resonance circuit are opposite to each other,
    wherein the touch controller determines a gap between the two electrodes as a position of the stylus,
    wherein
    some of the electrodes are positioned in a touch area, and the touch device further includes
    a plurality of traces positioned outside the touch area and connected to correspond to the electrodes,
    wherein the traces include traces in which directions of currents induced in the traces by the resonance circuit are opposite to each other; and
    wherein the plurality of electrodes are also configured to sense a position of an object using a capacitance sensing method.

2. The touch device of claim 1, wherein
    a current in a same direction as that of correspondingly connected traces is induced in the electrodes.

3. The touch device of claim 1, wherein
    a current in a different direction from that of correspondingly connected traces is induced in the electrodes.

4. The touch device of claim 1, wherein
    the electrodes include a plurality of first electrodes extending in a first direction, and
    the traces include first traces extending in a second direction intersecting the first direction and connected to first ends of a first group of the first electrodes, and second traces connected to second ends of a second group of the first electrodes.

5. The touch device of claim 1, wherein
    the touch controller determines a gap between electrodes having a largest difference in magnitude of the induced currents as a position of the stylus.

6. The touch device of claim 1, further comprising
    an antenna configured to include a plurality of dummy electrodes formed on a same layer as that of the electrodes and a plurality of bridges connecting the dummy electrodes to each other,
    wherein the touch controller applies a driving signal to the antenna to output an electro-magnetic signal for resonating the resonance circuit.

7. The touch device of claim 1, wherein
    each of the electrodes includes two signal input terminals, and
    the touch controller grounds one of the two signal input terminals and applies a driving signal to the other so that each of the electrodes outputs an electro-magnetic signal for resonating the resonance circuit.

8. The touch device of claim 1, wherein
    the electrodes are formed of a metal mesh.

9. The touch device of claim 1, wherein
    each of the electrodes includes two signal input terminals, and
    the touch controller applies driving signals of opposite phases to the two signal input terminals so that each of the electrodes outputs an electro-magnetic signal for sensing the resonance circuit.

10. The touch device of claim 1, further comprising
    a magnetic field shielding layer formed on a different layer from that of the electrodes.

11. The touch device of claim 10, wherein
    the display panel has a folding area that is bent about a folding axis and a non-folding area spaced apart by the folding area, and
    the magnetic field shielding layer is positioned to correspond to both the folding area and the non-folding area.

12. The touch device of claim 10, wherein
    the display panel has a folding area that is bent about a folding axis and a non-folding area spaced apart by the folding area, and
    the magnetic field shielding layer is spaced apart to correspond to the non-folding area.

13. A driving method for a touch device for sensing a position of a stylus including a resonance circuit driving, comprising:
    outputting a driving signal to a plurality of electrodes;
    receiving a sensing signal from the electrodes, the sensing signal including currents induced in the electrodes in opposite directions by the resonance circuit; and
    determining the position of the stylus from the sensing signal,
    wherein the determining of the position of the stylus includes
    determining a gap between electrodes in which the directions of the induced currents are opposite to each other as a position of the stylus,
    wherein some of the electrodes are positioned in a touch area,
    the touch device further includes a plurality of traces positioned outside the touch area and connected to correspond to the electrodes, and
    the sensing signal includes currents induced in the tracers in opposite directions by the resonance circuit, and
    wherein the plurality of electrodes are also configured to sense a position of an object using a capacitance sensing method.

14. The driving method of claim 13, wherein
    a current in a same direction as that of correspondingly connected traces is induced in the electrodes.

15. The driving method of claim 13, wherein
    a current in a different direction from that of correspondingly connected traces is induced in the electrodes.

16. The driving method of claim 13, wherein
    the determining of the position of the stylus includes
    determining a gap between electrodes having a largest difference in magnitude of the induced currents as a position of the stylus.

17. A touch system comprising:
    a stylus configured to include a resonance circuit; and a touch sensor configured to receive a sensing signal from a plurality of electrodes to determine a position of the stylus, wherein directions of currents induced in two electrodes of the plurality of electrodes by the resonance circuit are opposite to each other, wherein the touch sensor determines a gap between the two as a position of the stylus, wherein some of the electrodes are positioned in a touch area, the touch sensor further includes a plurality of traces positioned outside the touch area and connected to correspond to the electrodes, and wherein the traces include traces in which directions of currents induced in the traces by the resonance circuit are opposite to each other, wherein the plurality of electrodes are also configured to sense a position of an object using a capacitance sensing method.

* * * * *